US011740738B2

(12) United States Patent
Cho et al.

(10) Patent No.: US 11,740,738 B2
(45) Date of Patent: Aug. 29, 2023

(54) DISPLAY DEVICE INCLUDING SENSING DRIVER THAT DRIVES INPUT SENSING LAYER

(71) Applicant: SAMSUNG DISPLAY CO., LTD., Yongin-si (KR)

(72) Inventors: Hyeonseo Cho, Asan-si (KR); Bogeun Yuk, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/826,330

(22) Filed: May 27, 2022

(65) Prior Publication Data

US 2023/0072885 A1 Mar. 9, 2023

(30) Foreign Application Priority Data

Sep. 6, 2021 (KR) ........................ 10-2021-0118658

(51) Int. Cl.

| | |
|---|---|
| ***G06F 3/041*** | (2006.01) |
| ***G09G 3/3266*** | (2016.01) |
| ***G09G 3/3283*** | (2016.01) |
| ***G06F 3/044*** | (2006.01) |

(52) U.S. Cl.

CPC ........ *G06F 3/04184* (2019.05); *G06F 3/0443* (2019.05); *G09G 3/3266* (2013.01); *G09G 3/3283* (2013.01); *G09G 2310/0278* (2013.01); *G09G 2310/0294* (2013.01); *G09G 2354/00* (2013.01)

(58) Field of Classification Search

CPC . G06F 3/04184; G06F 3/0443; G09G 3/3266; G09G 3/3283

USPC .................................. 345/90, 174, 589, 690

See application file for complete search history.

(56) References Cited

U.S. PATENT DOCUMENTS

| | | | | |
|---|---|---|---|---|
| 9,785,283 | B2 | 10/2017 | Noguichi et al. | |
| 9,871,082 | B2 | 1/2018 | Jeon | |
| 2010/0156928 | A1 * | 6/2010 | Lee | G09G 3/3655 345/589 |

(Continued)

FOREIGN PATENT DOCUMENTS

| | | |
|---|---|---|
| KR | 10-1821012 | 1/2018 |
| KR | 10-2019-0031762 | 3/2019 |

(Continued)

*Primary Examiner* — Prabodh M Dharia

(74) *Attorney, Agent, or Firm* — F. Chau & Associates, LLC

(57) ABSTRACT

A display device includes a display panel that displays an image, an input sensing layer disposed on the display panel and that senses an input applied thereto from outside of the display device, a display driver that receives an image signal and drives the display panel at a first driving frequency or a second driving frequency lower than the first driving frequency, and a sensing driver that drives the input sensing layer. The display panel displays the image in a plurality of frames, each including a first period and/or a second period. The sensing driver drives the input sensing layer in the first period of each of the frames when the display panel is driven at the first driving frequency, and drives the input sensing layer in the second period of each of the frames when the display panel is driven at the second driving frequency.

19 Claims, 16 Drawing Sheets

(56) References Cited

U.S. PATENT DOCUMENTS

| | | | | |
|---|---|---|---|---|
| 2014/0375627 | A1* | 12/2014 | Kim | G09G 3/3677 345/90 |
| 2015/0145900 | A1* | 5/2015 | Lee | G09G 3/3648 345/691 |
| 2017/0153736 | A1* | 6/2017 | Kim | G06F 3/0443 |
| 2021/0149474 | A1 | 5/2021 | Choi | |
| 2022/0283703 | A1* | 9/2022 | Kida | G06F 3/0412 |

FOREIGN PATENT DOCUMENTS

| | | |
|---|---|---|
| KR | 10-2061108 | 1/2020 |
| KR | 10-2021-0059961 | 5/2021 |

* cited by examiner

DISPLAY DEVICE INCLUDING SENSING DRIVER THAT DRIVES INPUT SENSING LAYER

CROSS-REFERENCE TO RELATED APPLICATIONS

This application claims priority under 35 U.S.C. § 119 to Korean Patent Application No. 10-2021-0118658, filed on Sep. 6, 2021, the disclosure of which is hereby incorporated by reference in its entirety.

TECHNICAL FIELD

Embodiments of the present disclosure relate to a display device, and more particularly, to a display device having an input sensing function.

DISCUSSION OF RELATED ART

Various types of display devices may be implemented in various types of multimedia electronic devices such as, for example, televisions, mobile phones, tablet computers, navigation units, game units, etc.

The types of images displayed on such display devices may vary based on the type of electronic device in which the display device is implemented. As the driving frequency of a display device increases, the power consumption of the display device may also increase. Accordingly, the driving frequency of the display device may be controlled based on the images displayed by the display device.

Display devices may also include an input sensing layer that provides a touch-based input method, which allows users to intuitively input information or commands in addition to other input methods, such as, for example, a button, a keyboard, a mouse, etc.

SUMMARY

Embodiments of the present disclosure provide a display device capable of reducing noise occurring between a display panel and an input sensing layer.

Embodiments of the present disclosure provide a display device including a display panel that displays an image, an input sensing layer disposed on the display panel and that senses an input applied thereto from outside of the display device, a display driver that receives an image signal and drives the display panel at a first driving frequency or a second driving frequency lower than the first driving frequency, and a sensing driver that drives the input sensing layer. The display panel displays the image in a plurality of frames, each including a first period and/or a second period. The sensing driver drives the input sensing layer in the first period of each of the frames when the display panel is driven at the first driving frequency, and drives the input sensing layer in the second period of each of the frames when the display panel is driven at the second driving frequency.

In an embodiment, each of the frames includes only the first period in which the display driver outputs a display driving signal to the display panel when the display panel is driven at the first driving frequency, and each of the frames includes the first period and the second period in which the output display driving signal is held when the display panel is driven at the second driving frequency.

In an embodiment, the sensing driver drives the input sensing layer only in the second period when the display panel is driven at the second driving frequency.

In an embodiment, a length of the first period when the display panel is driven at the first driving frequency is about equal to a length of the first period when the display panel is driven at the second driving frequency in each of the frames.

In an embodiment, a length of the second period is about equal to or greater than the length of the first period in each of the frames when the display panel is driven at the first driving frequency.

In an embodiment, the second driving frequency includes a first frequency and a second frequency different from the first frequency, the length of the first period when the display panel is driven at the first frequency is about equal to the length of the first period when the display panel is driven at the second frequency in each of the frames, and the length of the second period when the display panel is driven at the first frequency is different from the length of the second period when the display panel is driven at the second frequency in each of the frames.

In an embodiment, the display driver includes a scan driver that outputs a scan signal to the display panel, a data driver that outputs a data signal to the display panel in a first driving mode in which the display panel is driven at the first driving frequency and in a second driving mode in which the display panel is driven at the second driving frequency, and a driving controller that receives the image signal and an external control signal and generates a scan control signal, a data control signal, and image data based on the image signal and the external control signal. The driving controller drives the display panel at the first driving frequency and the second driving frequency based on the image data.

In an embodiment, the driving controller includes a frequency control module that outputs a frequency control signal based on the image data to allow the data driver to operate in the first driving mode or the second driving mode.

In an embodiment, the frequency control module compares a first frame with a second frame, which are consecutive frames among the frames, controls the data driver to operate in the first driving mode when the image is changed, and controls the data driver to operate in the second driving mode when the image is not changed.

In an embodiment, the sensing driver generates a driving control signal to drive the input sensing layer, and the driving control signal includes a first driving signal to drive the input sensing layer using a first capacitance detection method and a second driving signal to drive the input sensing layer using a second capacitance detection method.

In an embodiment, the sensing driver alternately outputs the first driving signal and the second driving signal in each of the frames while driving the input sensing layer.

In an embodiment, the sensing driver outputs the driving control signal at a sensing frequency, and the sensing frequency is about equal to or higher than the first driving frequency.

Embodiments of the present disclosure provide a display device including a display panel that displays an image in a plurality of frames, each including a first period and/or a second period following the first period, an input sensing layer disposed on the display panel and that senses an input applied thereto from outside of the display device, a display driver that receives an image signal, drives the display panel at a first driving frequency in a first driving mode, and drives the display panel at a second driving frequency lower than the first driving frequency in a second driving mode, and a sensing driver that outputs a first driving signal and a second driving signal, which are alternately applied to the input sensing layer in each of the frames. Each of the frames includes the first period in the first driving mode, each of the frames includes the first period and the second period in the second driving mode, the sensing driver generates the first driving signal and the second driving signal in the first period of each of the frames in the first driving mode of the display driver, and the sensing driver generates only one of the first driving signal and the second driving signal in the first period of each of the frames and generates the first driving signal and the second driving signal in the second period of each of the frames in the second driving mode of the display driver.

In an embodiment, the display driver outputs a display driving signal to drive the display panel in the first period and holds the output display driving signal in the second period.

In an embodiment, the display driver determines the first driving mode as a driving mode of the display panel when a first image signal and a second image signal respectively corresponding to a first frame and a second frame following the first frame among the frames are different from each other, and determines the second driving mode as the driving mode of the display panel when the first image signal and the second image signal are the same as each other.

In an embodiment, a length of the first period of each of the frames in the first driving mode of the display driver is about equal to a length of the first period of each of the frames in the second driving mode of the display driver.

In an embodiment, the second period corresponds to a remaining period except the first period in each of the frames, and a length of the second period is inversely proportional to a magnitude of the second driving frequency.

In an embodiment, the display driver includes a scan driver that outputs a scan signal to the display panel and a data driver that outputs a data signal to the display panel, and the scan driver and/or the data driver is operated in the first period and is not operated in the second period in the second driving mode.

In an embodiment, the sensing driver drives the input sensing layer at a sensing frequency, and the sensing frequency is about equal to or greater than the first driving frequency of the display driver.

In an embodiment, the input sensing layer is disposed directly on the display panel.

According to embodiments of the present disclosure, noise occurring between the display panel and the input sensing layer when the input sensing layer is driven in response to an external input while the display panel is being driven may be reduced in the display device.

According to embodiments of the present disclosure, the display device includes a sensing driver that allows the input sensing layer to sense the external input only in some periods where the output driving signal is held in each frame when the display panel is driven at a low frequency. Thus, the noise occurring between a cathode of the display panel and input sensors of the input sensing layer may be reduced according to embodiments of the present disclosure.

BRIEF DESCRIPTION OF THE DRAWINGS

The above and other features of the present disclosure will become more apparent by describing in detail embodiments thereof with reference to the accompanying drawings, in which.

DETAILED DESCRIPTION

Figure 1:
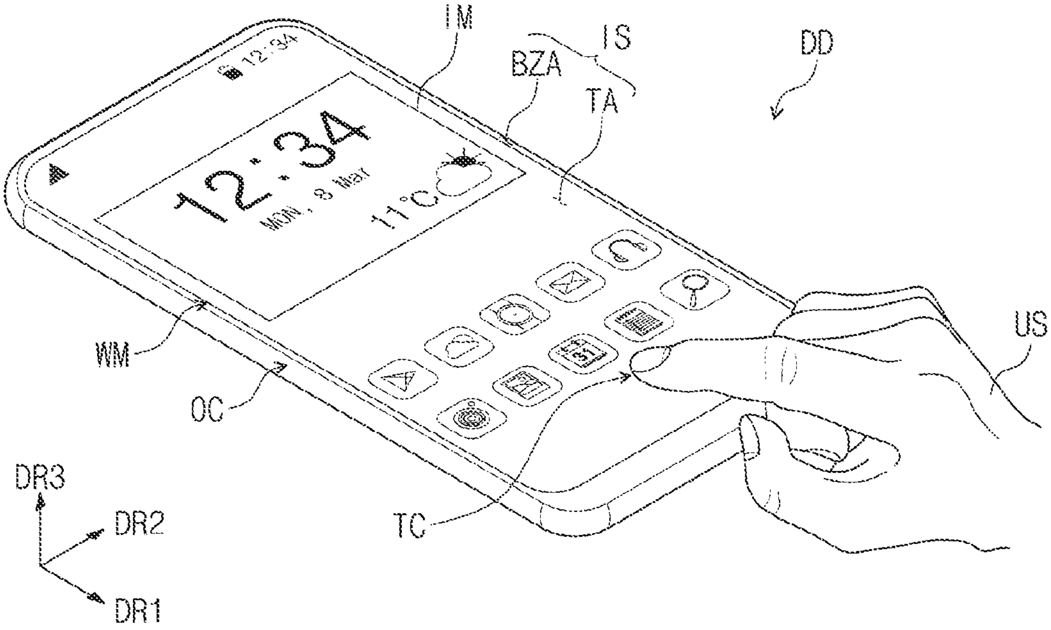
FIG. 1 is a perspective view of a display device according to an embodiment of the present disclosure.

Embodiments of the present disclosure will be described more fully hereinafter with reference to the accompanying drawings. Like reference numerals may refer to like elements throughout the accompanying drawings.

In the present disclosure, it will be understood that when an element (or area, layer, or portion) is referred to as being "on", "connected to" or "coupled to" another element or layer, it can be directly on, connected or coupled to the other element or layer, or intervening elements or layers may be present. Other words used to describe the relationships between components should be interpreted in a like fashion.

As used herein, the term "and/or" includes any and all combinations of one or more of the associated listed items.

It will be understood that, although the terms "first", :second", etc., may be used herein to describe various elements, these elements should not be limited by these terms. These terms are only used to distinguish one element from another element. Thus, a "first" element discussed below could be termed a "second" element without departing from the teachings of the present disclosure.

As used herein, the singular forms, "a", "an" and "the" are intended to include the plural forms as well, unless the context clearly indicates otherwise.

Spatially relative terms, such as "beneath", "below", "lower", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to exemplary embodiments, the parameter may be exactly the certain value or approximately the certain value within a measurement error as would be understood by a person having ordinary skill in the art. Other uses of these terms and similar terms to describe the relationships between components should be interpreted in a like fashion.

Figure 2:
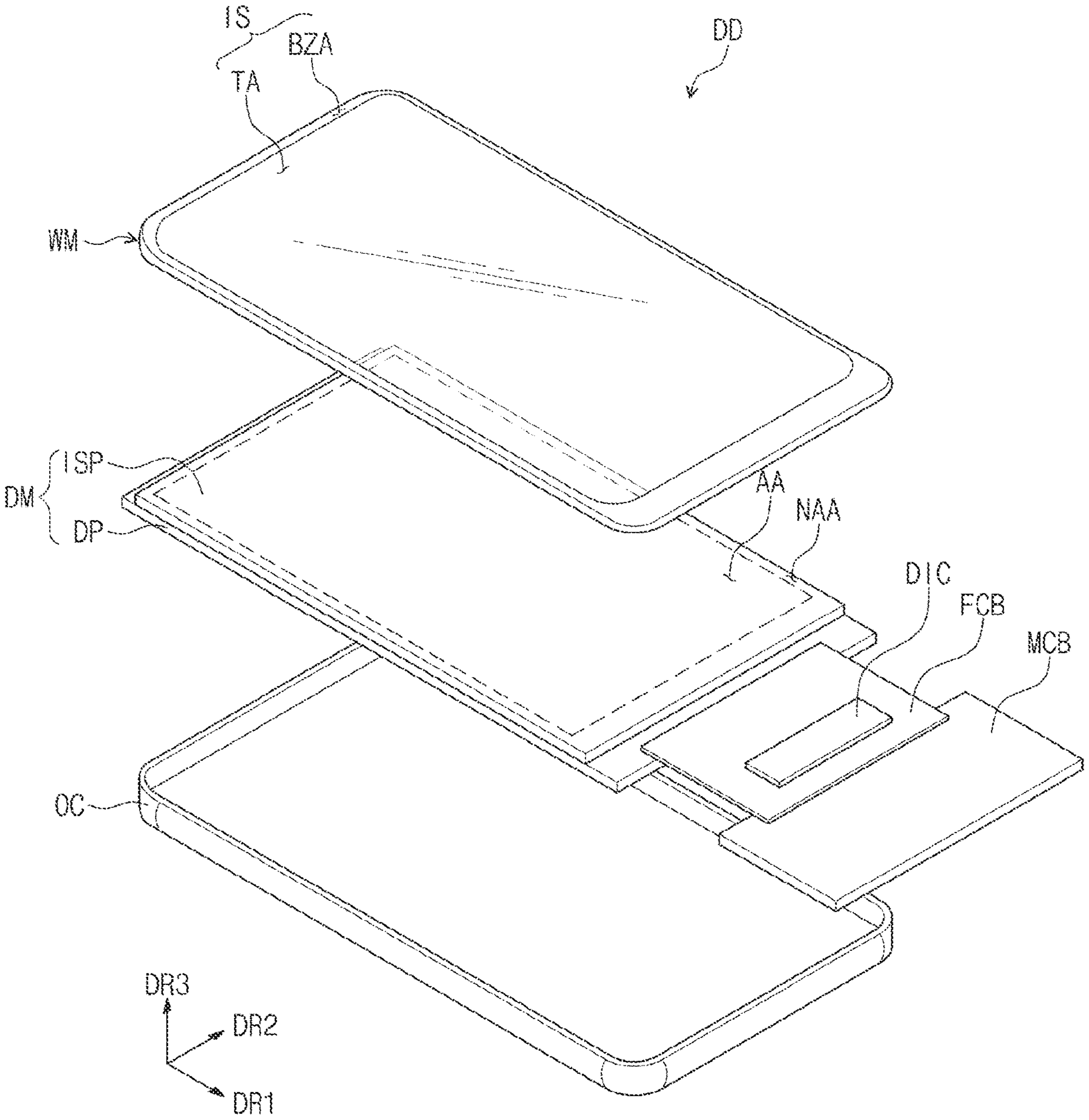
FIG. 2 is an exploded perspective view of a display device according to an embodiment of the present disclosure.

FIG. 1 is a perspective view of a display device DD according to an embodiment of the present disclosure. FIG. 2 is an exploded perspective view of the display device DD shown in FIG. 1 according to an embodiment of the present disclosure.

Referring to FIGS. 1 and 2, the display device DD may be a device activated in response to electrical signals. The display device DD may be applied to a large-sized display device, such as a television set or a monitor, and a small and medium-sized display device, such as a mobile phone, a tablet computer, a car navigation unit, or a game unit. However, these are merely examples, and the display device DD may be applied to other electronic devices as long as they do not depart from the concept of the present disclosure.

The display device DD may have a rectangular shape defined by long sides extending in a first direction DR1 and short sides extending in a second direction DR2 crossing the first direction DR1. However, the shape of the display device DD is not limited to a rectangular shape, and the display device DD may have a variety of shapes. The display device DD may display an image IM in a third direction DR3 through a display surface IS that is substantially parallel to each of the first direction DR1 and the second direction DR2. The display surface IS through which the image IM is displayed may correspond to a front surface of the display device DD.

In an embodiment, front (or upper) and rear (or lower) surfaces of each member are defined with respect to a direction in which the image IM is displayed. The front and rear surfaces are opposite to each other in the third direction DR3, and a normal line direction of each of the front and rear surfaces may be substantially parallel to the third direction DR3.

A separation distance in the third direction DR3 between the front surface and the rear surface may correspond to a thickness in the third direction DR3 of the display device DD. The first, second, and third directions DR1, DR2, and DR3 are relative to each other.

The display device DD may sense an external input applied thereto from outside of the display device DD. The external input may include various forms of inputs provided from outside of the display device DD. For example, the display device DD may sense an external input TC generated by a user US and applied thereto from outside of the display device DD. The external input TC generated by the user US may include one of various external inputs, such as, for example, a body part of the user US such as a finger, light, heat, pressure, etc., or a combination thereof. In an embodiment, a touch input applied to the front surface by a hand of the user US is described as the external input TC of the user US as a representative example. However, this is merely one example, and the external input TC by the user US may be provided in various ways. In addition, the display device DD may sense the external input TC by the user US which is applied to a side surface or rear surface of the display device DD according to its structure. However, embodiments of the present disclosure are not limited thereto.

According to an embodiment, the display device DD may sense a second input applied thereto from outside of the display device DD. The second input may include inputs generated by an input device such as, for example, a stylus pen, an active pen, a touch pen, an electronic pen, an e-pen, etc., in addition to the hand of the user US.

The front surface of the display device DD may be divided into a transmission area TA and a bezel area BZA. The image IM may be displayed through the transmission area TA. The user US may view the image IM through the transmission area TA. In an embodiment, the transmission area TA may have a quadrangular shape with rounded vertices. However, this is merely one example, and the transmission area TA may have a variety of shapes and is not limited thereto.

The bezel area BZA may be defined adjacent to the transmission area TA. The bezel area BZA may have a predetermined color. The bezel area BZA may surround the transmission area TA. Accordingly, the shape of the transmission area TA may be defined by the bezel area BZA. However, this is merely one example. For example, according to embodiments, the bezel area BZA may be disposed adjacent to only one side of the transmission area TA or may be omitted.

As shown in FIG. 2, the display device DD may include a display module DM and a window WM disposed on the display module DM. The display module DM may include a display panel DP and an input sensing layer ISP.

According to an embodiment, the display panel DP may be a light-emitting type display panel. However, the display panel DP is not limited thereto. For example, according to embodiments, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot or a quantum rod. Hereinafter, an organic light emitting display panel will be described as a representative example of the display panel DP. However, it is to be understood that embodiments of the present disclosure may be applied to display panels other than an organic light emitting display panel.

The display panel DP may output the image IM, and the image IM may be displayed through the display surface IS. The input sensing layer ISP may be disposed on the display panel DP and may sense the external input TC and the second input. The structure and function of the input sensing layer ISP will be described below with reference to FIGS. 4 and 5.

The window WM may include a transparent material through which the image IM is transmitted. For example, the window WM may include glass, sapphire, or plastic. Although the window WM is shown as a single layer, the window WM is not limited thereto. For example, according to embodiments, the window WM may include a plurality of layers.

According to embodiments of the present disclosure, the bezel area BZA of the display device DD may be defined by printing a material having a predetermined color on an area of the window WM. As an example, the window WM may include a light blocking pattern that defines the bezel area BZA. The light blocking pattern may be a colored organic layer and may be formed by a coating method.

The window WM may be coupled to the display module DM by an adhesive film. As an example, the adhesive film may include an optically clear adhesive (OCA) film. However, the adhesive film is not limited thereto. For example, according to embodiments, the adhesive film may include an ordinary adhesive. For example, the adhesive film may include an optically clear resin (OCR) or a pressure sensitive adhesive (PSA) film.

An anti-reflective layer may be further disposed between the window WM and the display module DM. The anti-reflective layer may reduce a reflectance with respect to an external light incident thereto from above of the window WM. According to an embodiment of the present disclosure, the anti-reflective layer may include a retarder and a polarizer. The retarder may be a film type or liquid crystal coating type and may include a 212 retarder and/or a 214 retarder. The polarizer may be a film type or liquid crystal coating type. The film type polarizer and retarder may include a stretching type synthetic resin film, and the liquid crystal coating type polarizer and retarder may include liquid crystals aligned in a predetermined alignment. The retarder and the polarizer may be implemented as one polarizing film.

The display module DM may display the image in response to electrical signals and may transmit/receive information on the external input TC. The display module DM may include an effective area AA and a non-effective area NAA. The effective area AA may be defined as an area through which the image provided from the display module DM is transmitted. In addition, the effective area AA may be defined as an area where the input sensing layer ISP senses the external input TC and where the second input is applied thereto from outside of the display device DD.

The non-effective area NAA may be defined adjacent to the effective area AA. For example, the non-effective area NAA may surround the effective area AA. However, this is merely an example, and the non-effective area NAA may be defined in various shapes and is not limited thereto. According to an embodiment, the effective area AA of the display module DM may correspond to at least a portion of the transmission area TA.

The display module DM may further include a main circuit board MCB, a flexible circuit film FCB, and a driving chip DIC. The main circuit board MCB may be connected to the flexible circuit film FCB and thus may be electrically connected to the display panel DP. The flexible circuit film FCB may be connected to the display panel DP and may electrically connect the display panel DP to the main circuit board MCB.

The main circuit board MCB may include a plurality of driving elements. The driving elements may include a circuit that drives the display panel DP. The driving chip DIC may be mounted on the flexible circuit film FCB. Although one flexible circuit film FCB is shown as a representative example, embodiments are not limited thereto. For example, according to embodiments, a plurality of flexible circuit films FCB may be provided, and the flexible circuit films FCB may be connected to the display panel DP. FIG. 2 shows a structure in which the driving chip DIC is mounted on the flexible circuit film FCB. However, the structure of the display device DD is not limited thereto. As an example, the driving chip DIC may be directly mounted on the display panel DP. In this case, a portion of the display panel DP on which the driving chip DIC is mounted may be bent to be disposed on a rear surface of the display module DM. In addition, the driving chip DIC may be directly mounted on the main circuit board MCB.

The input sensing layer ISP may be electrically connected to the main circuit board MCB via the flexible circuit film FCB. However, embodiments of the present disclosure are not limited thereto. For example, according to embodiments, the display module DM may further include a separate flexible circuit film that electrically connects the input sensing layer ISP to the main circuit board MCB.

The display device DD may further include an external case OC that accommodates the display module DM. The external case OC may be coupled to the window WM to define an exterior of the display device DD. The external case OC may absorb impact applied thereto from outside of the display device DD, and may prevent a foreign substance(s) and moisture from entering the display module DM, thereby protecting components accommodated in the external case OC. As an example, the external case OC may be provided in a form in which a plurality of accommodation members is combined.

According to an embodiment, the display device DD may further include an electronic module that includes various functional modules that operate the display module DM, a power supply module that supplies a power utilized for an overall operation of the display device DD, and a bracket coupled to the display module DM and/or the external case OC that divides an inner space of the display device DD.

Figure 3:
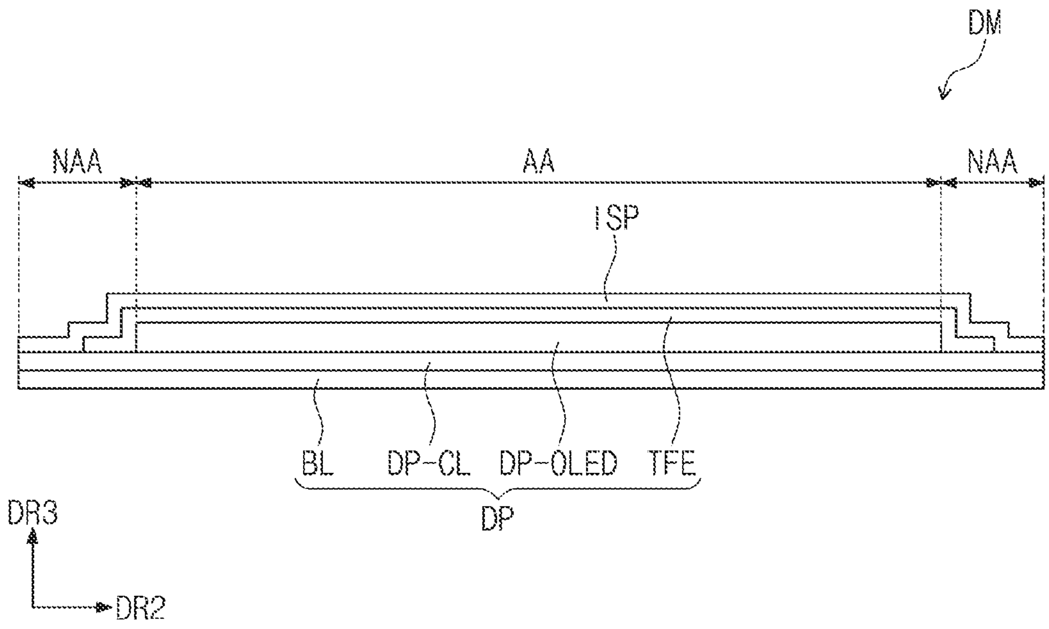
FIG. 3 is a cross-sectional view of a display module of FIG. 2 according to an embodiment of the present disclosure.

FIG. 3 is a cross-sectional view of the display module of FIG. 2 according to an embodiment of the present disclosure.

Referring to FIG. 3, the display module DM may include the display panel DP and the input sensing layer ISP. The display panel DP may include a base layer BL, a circuit element layer DP-CL, a display element layer DP-OLED, and an encapsulation layer TFE. The circuit element layer DP-CL, the display element layer DP-OLED, and the encapsulation layer TFE may be disposed on the base layer BL. According to embodiments, the display panel DP may further include functional layers, such as, for example, an anti-reflective layer, a refractive index adjustment layer, etc.

The base layer BL may include at least one plastic film. The base layer BL may include, for example, a plastic substrate, a glass substrate, a metal substrate, or an organic/inorganic composite material substrate. As an example, the base layer BL may be a flexible substrate. The effective area AA and the non-effective area NAA described with reference to FIG. 2 may be applied to the base layer BL in the same way.

The circuit element layer DP-CL may include at least one intermediate insulating layer and a circuit element. The intermediate insulating layer may include at least one intermediate inorganic layer and at least one intermediate organic layer. The circuit element may include signal lines and a pixel driving circuit.

The display element layer DP-OLED may include a plurality of light emitting elements. The light emitting elements may include organic light emitting diodes. The display element layer DP-OLED may further include an organic layer such as a pixel definition layer.

The encapsulation layer TFE may encapsulate the display element layer DP-OLED. The encapsulation layer TFE may include at least one inorganic layer. The encapsulation layer TFE may further include at least one organic layer. The inorganic layer may protect the display element layer DP-OLED from moisture and oxygen, and the organic layer may protect the display element layer DP-OLED from a foreign substance such as dust particles. The inorganic layer may include, for example, a silicon nitride layer, a silicon oxynitride layer, a silicon oxide layer, a titanium oxide layer, or an aluminum oxide layer. The organic layer may include an acrylic-based organic layer. However, the organic layer is not limited thereto.

The input sensing layer ISP may be formed on the display panel DP through successive processes. In addition, the input sensing layer ISP may be coupled to the display panel DP by an adhesive film. The input sensing layer ISP may have a multi-layer structure. The input sensing layer ISP may have a single-layer structure of an insulating layer or a multi-layer structure of insulating layers. According to an embodiment, in the case where the input sensing layer ISP is disposed directly on the display panel DP through the successive processes, the input sensing layer ISP may be disposed directly on the encapsulation layer TFE, and the adhesive film is not disposed between the input sensing layer ISP and the display panel DP. However, according to an embodiment, the adhesive film may be disposed between the input sensing layer ISP and the display panel DP. In this case, in an embodiment, the input sensing layer ISP is not manufactured through the successive processes with the display panel DP, and the input sensing layer ISP may be fixed to an upper surface of the display panel DP by the adhesive film after being manufactured through a separate process.

According to an embodiment, the display panel DP may further include an encapsulation substrate. The encapsulation substrate may be disposed on the display element layer DP-OLED to face the base layer BL. The encapsulation substrate may include, for example, a plastic substrate, a glass substrate, a metal substrate, or an organic/inorganic composite material substrate. A sealant may be disposed between the encapsulation substrate and the base layer BL, and the encapsulation substrate and the base layer BL may be coupled to each other by the sealant. The sealant may include an organic adhesive or a frit that is a ceramic adhesive material. The display element layer DP-OLED may be encapsulated by the sealant and the encapsulation substrate.

In the case where the input sensing layer ISP is disposed directly on the display panel DP through the successive processes, the input sensing layer ISP may be disposed directly on the encapsulation substrate. However, according to an embodiment, in the case where the adhesive film is disposed between the input sensing layer ISP and the display panel DP, the input sensing layer ISP may be fixed to an upper surface of the encapsulation substrate by the adhesive film.

Figure 4:
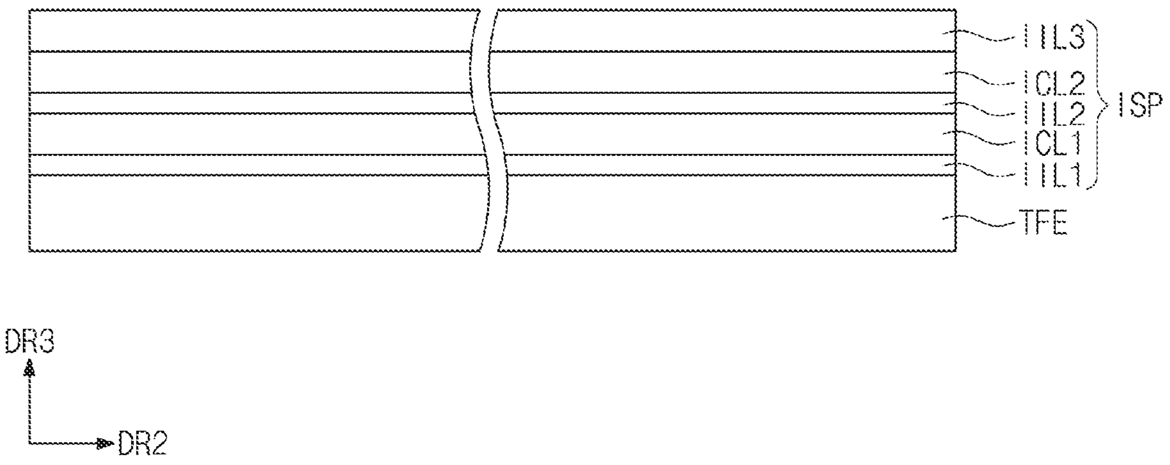
FIG. 4 is a cross-sectional view of an input sensing layer according to an embodiment of the present disclosure.

FIG. 4 is a cross-sectional view of an input sensing layer ISP according to an embodiment of the present disclosure.

Referring to FIG. 4, the input sensing layer ISP may include a first sensing insulating layer IIL1, a first conductive layer ICL1, a second sensing insulating layer IIL2, a second conductive layer ICL2, and a third sensing insulating layer IIL3. The first sensing insulating layer IIL1 may be disposed directly on the encapsulation layer TFE. According to an embodiment, the first sensing insulating layer IIL1 may be omitted.

Each of the first conductive layer ICL1 and the second conductive layer ICL2 may include a plurality of conductive patterns. The conductive patterns may include a plurality of sensing electrodes SE1_1 through SE1_5 and SE2_1 through SE2_4, and a plurality of signal lines SL1_1 through SL1_5 and SL2_1 through SL2_4 connected to the sensing electrodes SE1_1 through SE1_5 and SE2_1 through SE2_4 (refer to FIG. 5).

Each of the first sensing insulating layer IIL1, the second sensing insulating layer IIL2, and the third sensing insulating layer IIL3 may include an inorganic material or an organic material. In an embodiment, each of the first sensing insulating layer IIL1 and the second sensing insulating layer IIL2 may be an inorganic layer. The inorganic layer may include at least one of, for example, aluminum oxide, titanium oxide, silicon oxide, silicon oxynitride, zirconium oxide, and hafnium oxide. The inorganic layer may have a thickness of about 1000 angstroms to about 4000 angstroms.

The third sensing insulating layer IIL3 may be an organic layer. The organic layer may include at least one of, for example, an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, and a perylene-based resin. The third sensing insulating layer IIL3 including the organic material may prevent moisture from entering the first conductive layer ICL1 and the second conductive layer ICL2 from outside of the display device DD.

Figure 5:
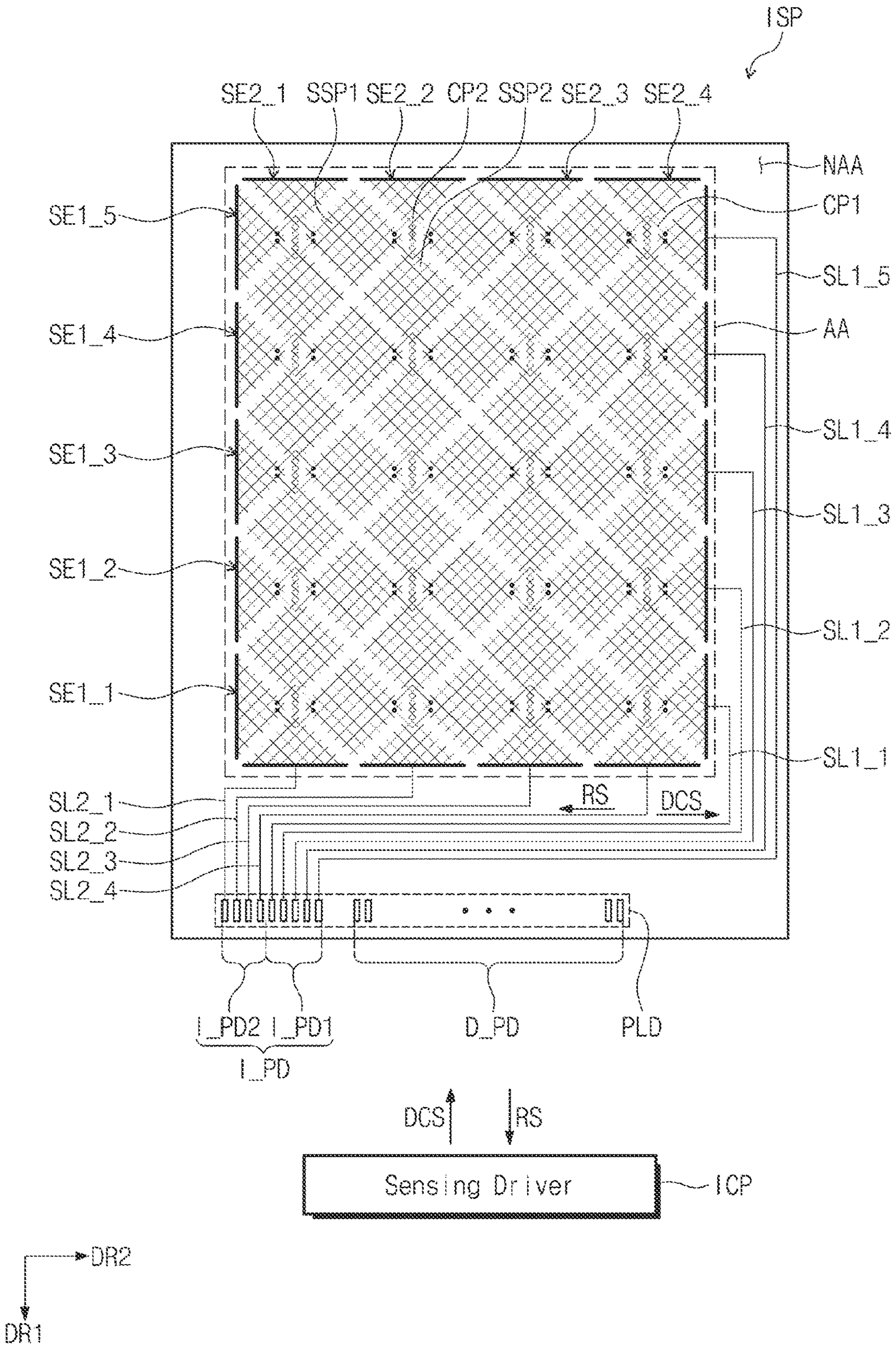
FIG. 5 is a plan view of a sensing driver and an input sensing layer according to an embodiment of the present disclosure.

FIG. 5 is a plan view of the sensing driver ICP and the input sensing layer ISP according to an embodiment of the present disclosure.

Referring to FIG. 5, the input sensing layer ISP may include an effective area AA and a non-effective area NAA adjacent to the effective area AA. The sensing electrodes SE1_1 through SE1_5 and SE2_1 through SE2_4 may be disposed in the effective area AA, and the signal lines SL1_1 through SL1_5 and SL2_1 through SL2_4 may be disposed in the non-effective area NAA.

As an example, the sensing electrodes SE1_1 through SE1_5 and SE2_1 through SE2_4 may include transmission electrodes SE1_1 through SE1_5 and reception electrodes SE2_1 through SE2_4.

The signal lines SL1_1 through SL1_5 and SL2_1 through SL2_4 may include transmission signal lines SL1_1 through SL1_5 connected to the transmission electrodes SE1_1 through SE1_5, and reception signal lines SL2_1 through SL2_4 connected to the reception electrodes SE2_1 through SE2_4.

The transmission electrodes SE1_1 through SE1_5 may cross the reception electrodes SE2_1 through SE2_4. The transmission electrodes SE1_1 through SE1_5 may be arranged in the first direction DR1 and may extend in the second direction DR2. The reception electrodes SE2_1 through SE2_4 may be arranged in the second direction DR2 and may extend in the first direction DR1.

The input sensing layer ISP may obtain coordinate information by a mutual capacitance method. A capacitance may be formed between the transmission electrodes SE1_1 through SE1_5 and the reception electrodes SE2_1 through SE2_4. The capacitance between the transmission electrodes SE1_1 through SE1_5 and the reception electrodes SE2_1 through SE2_4 may be changed by the external input TC (refer to FIG. 1) using a body part of the user US (refer to FIG. 1). As an example, the capacitance between the transmission electrodes SE1_1 through SE1_5 and the reception electrodes SE2_1 through SE2_4 may be changed by the external input generated by the input device rather than the body part of the user US. The sensitivity of the input sensing layer ISP may be determined depending on a variation in the capacitance.

However, embodiments of the present disclosure are not limited thereto. For example, according to embodiments, the input sensing layer ISP may obtain the coordinate information by a self-capacitance method. The transmission electrodes SE1_1 through SE1_5 and the reception electrodes SE2_1 through SE2_4 may be integrated in one sensing electrode and may sense the external input TC.

According to an embodiment, a method of obtaining the coordinate information of the input sensing layer ISP is not limited to the mutual capacitance method or the self-capacitance method. The input sensing layer ISP may obtain the coordinate information by using both the mutual capacitance method and the self-capacitance method together.

Each of the transmission electrodes SE1_1 through SE1_5 may include first sensor portions SSP1 and first connection portions CP1, which are arranged in the effective area AA. Each of the reception electrodes SE2_1 through SE2_4 may include second sensor portions SSP2 and second connection portions CP2, which are arranged in the effective area AA.

Among the first sensor portions SSP1, two first sensor portions SSP1 disposed at both ends of one transmission electrode may have a size smaller than that of the first sensor portion SSP1 disposed at a center. For example, the two first sensor portions SSP1 disposed at both ends of the transmission electrode may have a size that is about one half (½) of the size of the first sensor portion SSP1 disposed at the center. Among the second sensor portions SSP2, two second sensor portions SSP2 disposed at both ends of one reception electrode may have a size smaller than that of the second sensor portion SSP2 disposed at a center. For example, the two second sensor portions SSP2 disposed at both ends of the reception electrode may have a size that is one half (½) of the size of the second sensor portion SSP2 disposed at the center.

FIG. 5 shows the transmission electrodes SE1_1 through SE1_5 and the reception electrodes SE2_1 through SE2_4 according to an embodiment. The shape of the transmission electrodes SE1_1 through SE1_5 and the reception electrodes SE2_1 through SE2_4 is not limited to the shape shown in FIG. 5. For example, according to an embodiment of the present disclosure, the transmission electrodes SE1_1 through SE1_5 and the reception electrodes SE2_1 through SE2_4 may have a bar shape in which the sensor portion and the connection portion are not distinguished from each other. In FIG. 5, the first sensor portions SSP1 and the second sensor portions SSP2, which have a lozenge shape, are shown. However, the shapes of the first sensor portions SSP1 and the second sensor portions SSP2 are not limited to the lozenge shape. For example, according to embodiments, the first sensor portions SSP1 and the second sensor portions SSP2 may have different polygonal shapes from each other.

In one transmission electrode, the first sensor portions SSP1 may be arranged in the second direction DR2, and in one reception electrode, the second sensor portions SSP2 may be arranged in the first direction DR1. Each of the first connection portions CP1 may connect the first sensor portions SSP1 adjacent to each other, and each of the second connection portions CP2 may connect the second sensor portions SSP2 adjacent to each other.

The transmission electrodes SE1_1 through SE1_5 and the reception electrodes SE2_1 through SE2_4 may have a mesh shape. As a result of the transmission electrodes SE1_1 through SE1_5 and the reception electrodes SE2_1 through SE2_4 having a mesh shape, a parasitic capacitance between electrodes included in the display panel DP (refer to FIG. 2) and the transmission electrodes SE1_1 through SE1_5 and the reception electrodes SE2_1 through SE2_4 may be reduced.

The transmission electrodes SE1_1 through SE1_5 and the reception electrodes SE2_1 through SE2_4, which have the mesh shape, may include, for example, silver, aluminum, copper, chromium, nickel, titanium, etc. However, materials of the transmission electrodes SE1_1 through SE1_5 and the reception electrodes SE2_1 through SE2_4 are not limited thereto.

The transmission signal lines SL1_1 through SL1_5 and the reception signal lines SL2_1 through SL2_4 may be disposed in the non-effective area NAA.

The input sensing layer ISP may include input pads I_PD extending from one end of each of the transmission signal lines SL1_1 through SL1_5 and the reception signal lines SL2_1 through SL2_4 and disposed in the non-effective area NAA. The input pads I_PD may be electrically connected to the transmission signal lines SL1_1 through SL1_5 and the reception signal lines SL2_1 through SL2_4. As an example, the input pads I_PD may include a transmission input pad I_PD1 electrically connected to the transmission signal lines SL1_1 through SL1_5 and a reception input pad I_PD2 electrically connected to the reception signal lines SL2_1 through SL2_4.

As an example, a pad area PLD in which the input pads I_PD are disposed may be included in the non-effective area NAA. The input pads I_PD may be provided by exposing a portion of the circuit element disposed in the circuit element layer DP-CL (refer to FIG. 3) through an intermediate insulating layer included in the circuit element layer DP-CL.

Pixel pads D_PD may be further provided in the pad area PLD, and may connect the flexible circuit film FCB (refer to FIG. 2) to the display panel DP (refer to FIG. 2).

The display device DD may further include the sensing driver ICP that controls an operation of the input sensing layer ISP.

As an example, the sensing driver ICP may be electrically connected to the input sensing layer ISP. The sensing driver ICP may be electrically connected to the transmission signal lines SL1_1 through SL1_5 and the reception signal lines SL2_1 through SL2_4 via the input pads I_PD.

The sensing driver ICP may transmit a driving control signal DCS to the transmission electrodes SE1_1 through SE1_5 and may receive a sensing signal RS to which a variation in capacitance between the transmission electrodes SE1_1 through SE1_5 and the reception electrodes SE2_1 through SE2_4 is reflected from the reception electrodes SE2_1 through SE2_4. As an example, the driving control signal DCS may be a sensing scan signal sequentially transmitted to each of the transmission electrodes SE1_1 through SE1_5.

According to an embodiment, the sensing driver ICP may drive the input sensing layer ISP using a first capacitance detection method and/or a second capacitance detection method. The first capacitance detection method may be, for example, the mutual capacitance method, and the second capacitance detection method may be, for example, the self-capacitance method. As an example, the sensing driver ICP may transmit the driving control signal DCS, which includes a first driving signal MTS (refer to FIG. 9A) that drives the input sensing layer ICP using the first capacitance detection method, and a second driving signal SFS (refer to FIG. 9A) that drives the input sensing layer ICP using the second capacitance detection method, to the transmission electrodes SE1_1 through SE1_5.

The sensing driver ICP may transmit the driving control signal DCS to the input sensing layer ISP based on the driving frequency of the display panel DP. According to an embodiment, when the driving frequency of the display panel DP is a high frequency, the sensing driver ICP does not transmit the driving control signal DCS, and when the driving frequency of the display panel DP is a low frequency, the sensing driver ICP may transmit the driving control signal DCS. A further description thereof is provided below.

Figure 6A:
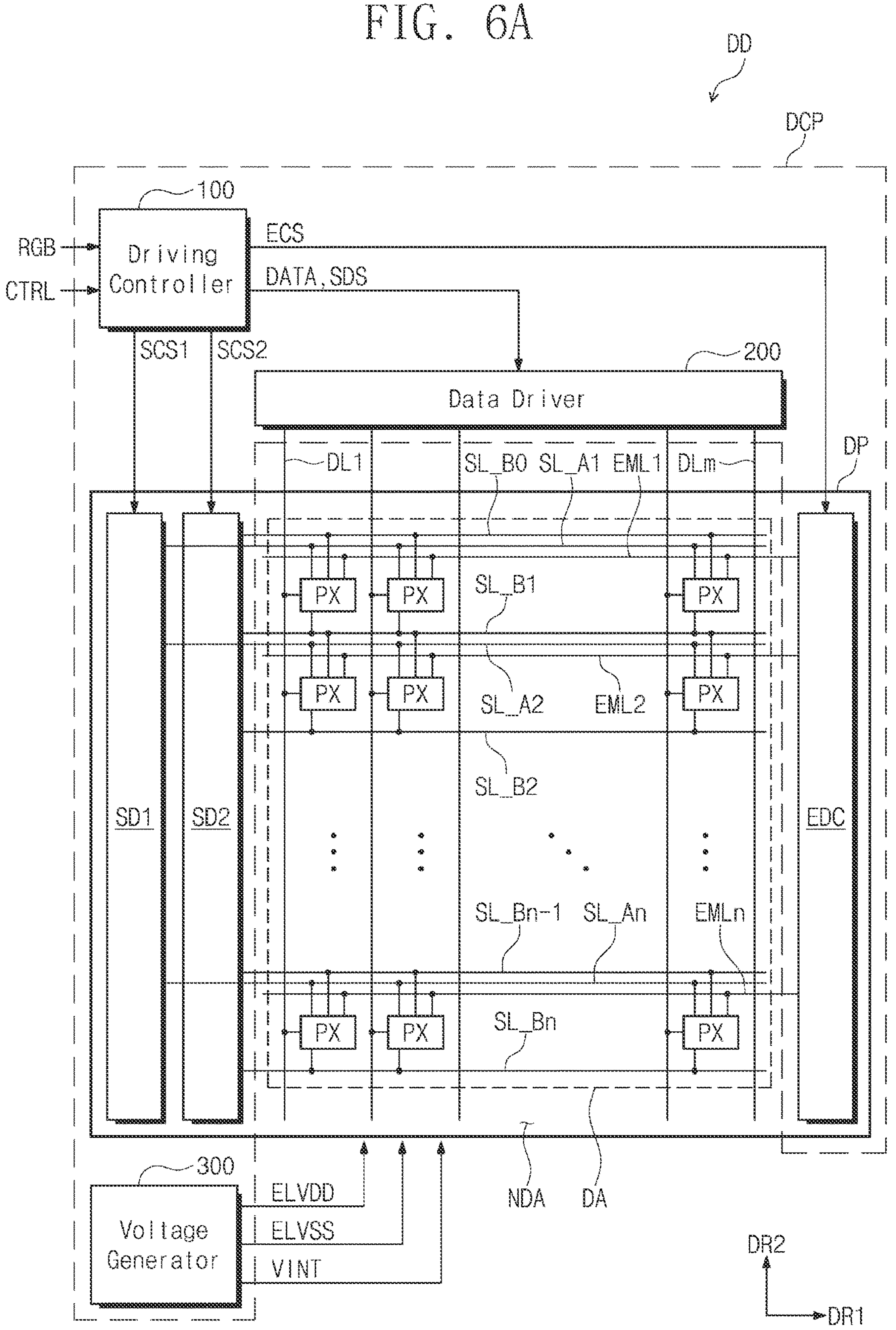
FIG. 6A is a block diagram of a display device according to an embodiment of the present disclosure.

FIG. 6A is a block diagram of the display device DD according to an embodiment of the present disclosure.

Referring to FIG. 6A, the display device DD may include the display panel DP and a display driver DCP.

The display driver DCP may include a data driver 200, scan drivers SD1 and SD2, a light emission driver EDC, a voltage generator 300, and a driving controller 100.

The driving controller 100 may receive image signals RGB and a control signal CTRL. The driving controller 100 may convert a data format of the image signals RGB to a data format appropriate for an interface between the data driver 200 and the driving controller 100 to generate an image data signal DATA. The control signal CTRL may include a vertical synchronization signal Vsync (refer to FIG. 7A), a horizontal synchronization signal Hsync (refer to FIG. 7A), and a main clock. The driving controller 100 may output scan control signals SCS1 and SCS2 and a data control signal SDS. The scan control signals may include a first scan control signal SCS1 and a second scan control signal SCS2.

The data driver 200 may receive the data control signal SDS and the image data signal DATA from the driving controller 100. The data driver 200 may convert the image data signal DATA to data signals and may output the data signals to a plurality of data lines DL1 through DLm described below, where m is a positive integer. The data signals may be analog voltages corresponding to grayscale values of the image data signal DATA.

The scan drivers SD1 and SD2 may include a first scan driver SD1 and a second scan driver SD2. The first scan driver SD1 may receive the first scan control signal SCS1 from the driving controller 100, and the second scan driver SD2 may receive the second scan control signal SCS2 from the driving controller 100. The first scan driver SD1 may output low frequency scan signals in response to the first scan control signal SCS1. The second scan driver SD2 may output high frequency scan signals in response to the second scan control signal SCS2.

The voltage generator 300 may generate voltages utilized for an operation of the display panel DP. According to an embodiment, the voltage generator 300 may generate a first driving voltage ELVDD, a second driving voltage ELVSS, and an initialization voltage VINT.

The display panel DP may include low frequency scan lines SL_A1 through SL_An, high frequency scan lines SL_B0 through SL_Bn, light emission control lines EML1 through EMLn, the data lines DL1 through DLm, and the pixels PX, where n and m are positive integers. The low frequency scan lines SL_A1 through SL_An, the high frequency scan lines SL_B0 through SL_Bn, the light emission control lines EML1 through EMLn, the data lines DL1 through DLm, and the pixels PX may be arranged in a display area DA. The low frequency scan lines SL_A1 through SL_An, the high frequency scan lines SL_B0 through SL_Bn, and the light emission control lines EML1 through EMLn may extend in the first direction DR1. The low frequency scan lines SL_A1 through SL_An, the high frequency scan lines SL_B0 through SL_Bn, and the light emission control lines EML1 through EMLn may be arranged in the second direction DR2 and may be spaced apart from each other. The second direction DR2 may cross the first direction DR1. The data lines DL1 through DLm may extend in the second direction DR2 and may be arranged in the first direction DR1 to be spaced apart from each other.

The pixels PX may be electrically connected to the low frequency scan lines SL_A1 through SL_An, the high frequency scan lines SL_B0 through SL_Bn, the light emission control lines EML1 through EMLn, and the data lines DL1 through DLm. Each of the pixels PX may be electrically connected to three scan lines. For example, as shown in FIG. 6A, the pixels PX arranged in a first row may be connected to a first low frequency scan line SL_A1, a dummy high frequency scan line SL_B0, and a first high frequency scan line SL_B1. The pixels PX arranged in a second row may be connected to a second low frequency scan line SL_A2, the first high frequency scan line SL_B1, and a second high frequency scan line SL_B2.

The first and second scan drivers SD1 and SD2 may be disposed in a non-display area NDA of the display panel DP. The first scan driver SD1 may output the low frequency scan signals to the low frequency scan lines SL_A1 through SL_An in response to the first scan control signal SCS1, and the second scan driver SD2 may output the high frequency scan signals to the high frequency scan lines SL_B0 through SL_Bn in response to the second scan control signal SCS2.

For example, the first scan driver SD1 may drive the low frequency scan lines SL_A1 through SL_An at a first scan frequency in response to the first scan control signal SCS1, and the second scan driver SD2 may drive the high frequency scan lines SL_B0 through SL_Bn at a second scan frequency in response to the second scan control signal SCS2. The second scan frequency may be higher than the first scan frequency.

The light emission driver EDC may receive a light emission driving signal ECS from the driving controller 100. The light emission driver EDC may output light emission control signals to the light emission control lines EML1 through EMLn in response to the light emission driving signal ECS.

The light emission driver EDC may be disposed in the non-display area NDA of the display panel DP. As an example, the first and second scan drivers SD1 and SD2 may be disposed adjacent to a first side of the display area DA, and the light emission driver EDC may be disposed adjacent to a second side of the display area DA. For example, the display area DA may be disposed between the first and second scan drivers SD1 and SD2 and the light emission driver EDC. However, embodiments of the present disclosure are not limited thereto. As an example, the light emission driver EDC may be disposed adjacent to the first side of the display area DA with the first and second scan drivers SD1 and SD2. According to an embodiment, the first scan driver SD1 may be disposed adjacent to the first side of the display area DA, and the second scan driver SD2 and the light emission driver EDC may be disposed adjacent to the second side of the display area DA.

Each of the pixels PX may include a light emitting element ED (refer to FIG. 6B) and a pixel circuit part PXC (refer to FIG. 6B) that controls an emission of the light emitting element ED. The pixel circuit part PXC may include a plurality of transistors and a capacitor. At least one of the first and second scan drivers SD1 and SD2 and the light emission driver EDC may include transistors formed through the same processes as those of the pixel circuit part PXC.

Each of the pixels PX may receive the first driving voltage ELVDD, the second driving voltage ELVSS, and the initialization voltage VINT from the voltage generator 300.

Figure 6B:
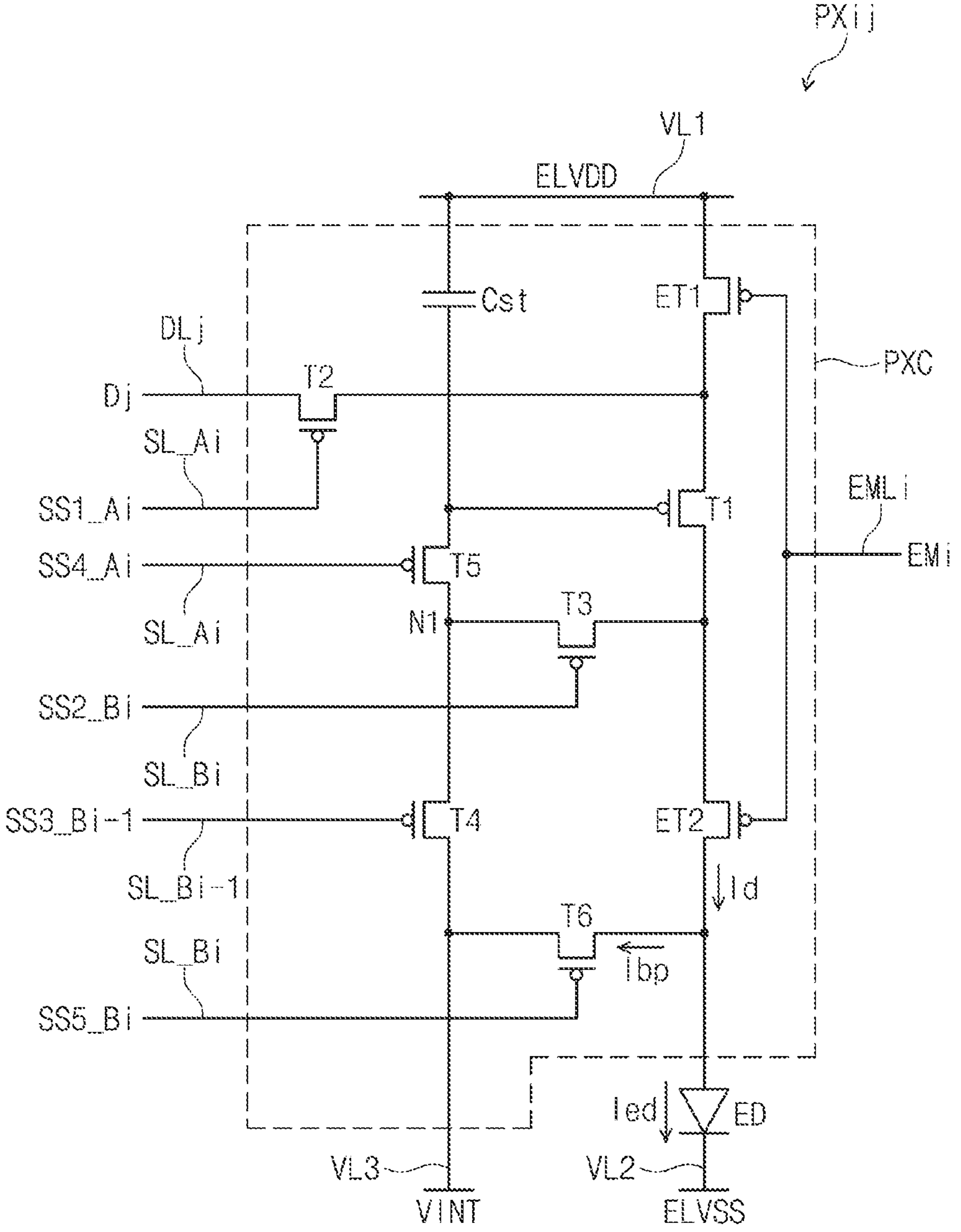
FIG. 6B is a circuit diagram of a pixel according to an embodiment of the present disclosure.
Figure 6C:
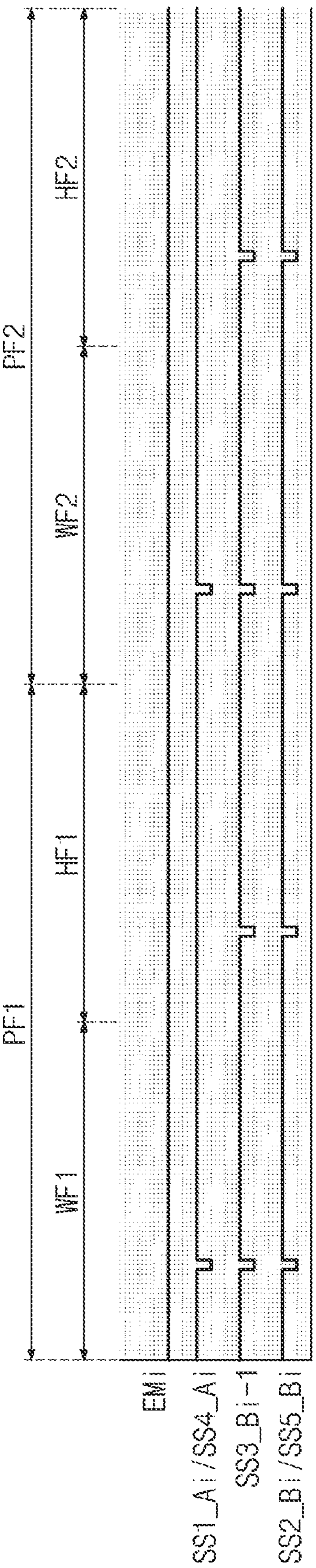
FIG. 6C is a timing diagram showing an operation of the pixel of FIG. 6B according to an embodiment of the present disclosure.

FIG. 6B is a circuit diagram of a pixel PXij according to an embodiment of the present disclosure. FIG. 6C is a timing diagram showing an operation of the pixel PXij of FIG. 6B according to an embodiment of the present disclosure.

FIG. 6B shows an equivalent circuit diagram of the pixel PXij among the pixels PX shown in FIG. 6A as a representative example, where i and j are positive integers. Since the pixels PX have substantially the same circuit configuration, the configuration of the pixel PXij will be described as a representative example of the pixels PX.

Referring to FIG. 6B, the pixel PXij may be connected to a j-th data line DLj (hereinafter, referred to as a current data line) among the data lines DL1 through DLm, an i-th low frequency scan line SL_Ai (hereinafter, referred to as a current low frequency scan line) among the low frequency scan lines SL_A1 through SL_An, an (i-1)th high frequency scan line SL_Bi-1 (hereinafter, referred to as a previous high frequency scan line) among the high frequency scan lines SL_B0 through SL_Bn, an i-th high frequency scan line SL_Bi (hereinafter, referred to as a current high frequency scan line) among the high frequency scan lines SL_B0 through SL_Bn, and an i-th light emission control line EMLi (hereinafter, referred to as a current light emission control line) among the light emission control lines EML1 through EMLn.

The pixel PXij may include the light emitting element ED and the pixel circuit part PXC. The pixel circuit part PXC may include first, second, third, fourth, fifth, and sixth transistors T1, T2, T3, T4, T5, and T6, first and second light emission control transistors ET1 and ET2, and one capacitor Cst. Each of the first through sixth transistors T1 through T6 and the first and second light emission control transistors ET1 and ET2 may be a transistor including a low-temperature polycrystalline silicon (LTPS) semiconductor layer. The first through sixth transistors T1 through T6 may be implemented by substantially the same type of transistor as each other. As an example, each of the first through sixth transistors T1 through T6 may be a P-type transistor, and each of the first and second light emission control transistors ET1 and ET2 may also be the P-type transistor. However, the configuration of the pixel circuit part PXC is not limited to the configuration shown in FIG. 6B. For example, according to an embodiment, each of the first through sixth transistors T1 through T6 may be an N-type transistor, and each of the first and second light emission control transistors ET1 and ET2 may also be an N-type transistor.

The first transistor T1 may include a first electrode connected to a first voltage line VL1 via the first light emission control transistor ET1, a second electrode electrically connected to an anode of the light emitting element ED via the second light emission control transistor ET2, and a third electrode connected to the capacitor Cst. The first voltage line VL1 may transmit the first driving voltage ELVDD to the pixel PXij. The first transistor T1 may receive a data signal Dj transmitted via the current data line DLj according to a switching operation of the second transistor T2 and may supply a driving current Id to the light emitting element ED.

The second transistor T2 may include a first electrode connected to the current data line DLj, a second electrode connected to the first electrode of the first transistor T1, and a third electrode that receives a first scan signal SS1_Ai. The third electrode of the second transistor T2 may be electrically connected to the current low frequency scan line SL_Ai. Accordingly, the second transistor T2 may receive an i-th low frequency scan signal provided from the current low frequency scan line SL_Ai as the first scan signal SS1_Ai. The second transistor T2 may be turned on in response to the first scan signal SS1_Ai and may transmit the data signal Dj applied thereto via the current data line DLj to the first electrode of the first transistor T1.

The third transistor T3 may include a first electrode connected to a first node N1, a second electrode connected to the second electrode of the first transistor T1, and a third electrode that receives a second scan signal SS2_Bi. The third electrode of the third transistor T3 may be electrically connected to the current high frequency scan line SL_Bi. Accordingly, the third transistor T3 may receive an i-th high frequency scan signal provided from the current high frequency scan line SL_Bi as the second scan signal SS2_Bi. The third transistor T3 may be turned on in response to the second scan signal SS2_Bi and may electrically connect the first node N1 to the second electrode of the first transistor T1.

The fourth transistor T4 may include a first electrode connected to the first node N1, a second electrode connected to a third voltage line VL3, and a third electrode that receives a third scan signal SS3_Bi-1. The third voltage line VL3 may transmit the initialization voltage VINT to the pixel PXij. The third electrode of the fourth transistor T4 may be electrically connected to the previous high frequency scan line SL_Bi-1. Accordingly, the fourth transistor T4 may receive an (i-1)th high frequency scan signal provided from the previous high frequency scan line SL_Bi-1 as the third scan signal SS3_Bi-1. The fourth transistor T4 may be turned on in response to the third scan signal SS3_Bi-1 and may transmit the initialization voltage VINT to the first node N1, and thus, an initialization operation that initializes the first node N1 may be performed.

The fifth transistor T5 may include a first electrode connected to the third electrode of the first transistor T1, a second electrode connected to the first node N1, and a third electrode that receives a fourth scan signal SS4_Ai. The third electrode of the fifth transistor T5 may be electrically connected to the current low frequency scan line SL_Ai. Accordingly, the fifth transistor T5 may receive the i-th low frequency scan signal provided from the current low frequency scan line SL_Ai as the fourth scan signal SS4_Ai. The fifth transistor T5 may be turned on in response to the fourth scan signal SS4_Ai and may electrically connect the first node N1 to the third electrode of the first transistor T1.

One end of the capacitor Cst may be connected to the first electrode of the first transistor T1, and the other end of the capacitor Cst may be connected to the first voltage line VL1.

The first light emission control transistor ET1 may include a first electrode connected to the first voltage line VL1, a second electrode connected to the first electrode of the first transistor T1, and a third electrode connected to the current light emission control line EMLi.

The second light emission control transistor ET2 may include a first electrode connected to the second electrode of the first transistor T1, a second electrode connected to the anode of the light emitting element ED, and a third electrode connected to the current light emission control line EMLi.

The first and second light emission control transistors ET1 and ET2 may be substantially simultaneously turned on in response to a light emission control signal EMi applied thereto via the current light emission control line EMLi. The first driving voltage ELVDD provided via the turned-on first light emission control transistor ET1 may be transmitted to the light emitting element ED via the first transistor T1 and the second light emission control transistor ET2.

The sixth transistor T6 may include a first electrode connected to the second electrode of the fourth transistor T4, a second electrode connected to the second electrode of the second light emission control transistor ET2, and a third electrode that receives a fifth scan signal SS5_Bi. The third electrode of the sixth transistor T6 may be electrically connected to the current high frequency scan line SL_Bi. Accordingly, the sixth transistor T6 may receive the i-th high frequency scan signal provided from the current high frequency scan line SL_Bi as the fifth scan signal SS5_Bi. The sixth transistor T6 may be turned on in response to the fifth scan signal SS5_Bi and may perform an operation that initializes the anode of the light emitting element ED to the initialization voltage VINT.

The anode of the light emitting element ED may be connected to the second electrode of the second light emission control transistor ET2 and the second electrode of the sixth transistor T6, and a cathode of the light emitting element ED may be connected to a second voltage line VL2. The second voltage line VL2 may transmit the second driving voltage ELVSS to the pixel PXij.

The first and fourth scan signals SS1_Ai and SS4_Ai may be low frequency scan signals output from the first scan driver SD1 that is operated at the first scan frequency, and the second, third, and fifth scan signals SS2_Bi, SS3_Bi-1, and SS5_Bi may be high frequency scan signals output from the second scan driver SD2 that is operated at the second scan frequency. As an example, each of the first and fourth scan signals SS1_Ai and SS4_Ai may be the i-th low frequency scan signal provided from the current low frequency scan line SL_Ai. Each of the second and fifth scan signals SS2_Bi and SS5_Bi may be the i-th high frequency scan signal provided from the current high frequency scan line SL_Bi. However, embodiments of the present disclosure are not limited thereto. As an example, in an embodiment, the first and fourth scan signals SS1_Ai and SS4_Ai may be signals provided via different low frequency scan lines from each other, and the second and fifth scan signals SS2_Bi and SS5_Bi may be signals provided via different high frequency scan lines from each other.

Referring to FIGS. 6A and 6C, an operation frequency of the display panel DP may be defined as the driving frequency of the display panel DP. A display driver may drive the display panel DP at a first driving frequency in a first driving mode and may drive the display panel DP at a second driving frequency in a second driving mode. The second driving frequency may be lower than the first driving frequency. As an example, the second driving frequency may have a low frequency from about 10 Hz to about 60 Hz, and the first driving frequency may have a high frequency from about 120 Hz to about 240 Hz.

In the first driving mode (a high frequency driving mode), the first scan driver SD1 may operate at the first scan frequency, and the second scan driver SD2 may operate at the second scan frequency equal to or higher than the first scan frequency. In this case, the first scan frequency may be the same as the first driving frequency, and the second scan frequency may be equal to or higher than the first driving frequency. As an example, when the first driving frequency is about 120 Hz, the first scan frequency may be about 120 Hz, and the second scan frequency may be about 120 Hz or about 240 Hz.

In the second driving mode (a low frequency driving mode), the first scan driver SD1 may operate at the first scan frequency, and the second scan driver SD2 may operate at the second scan frequency higher than the first scan frequency. In this case, the first scan frequency may be the same as the second driving frequency, and the second scan frequency may be higher than the second driving frequency. As an example, when the second driving frequency is about 30 Hz, the first scan frequency may be about 30 Hz, and the second scan frequency may be about 60 Hz.

In the second driving mode, the display panel DP may display the image during a plurality of frames. For convenience of explanation, FIG. 6C shows two consecutive frames, e.g., first and second frames PF1 and PF2, among the frames. Each of the frames may include a first period and a second period. The first period may be referred to as a writing period, and the second period may be referred to as a holding period. The writing period may correspond to a period in which a display driving signal utilized to drive the display panel DP is generated, and the holding period may correspond to a period in which the generated display driving signal is held and a new display driving signal is not generated. In this case, the display driving signal may correspond to the data signal as a representative example. The first frame PF1 may include a first writing period WF1 and a first holding period HF1, and the second frame PF2 may include a second writing period WF2 and a second holding period HF2.

During the first and second writing periods WF1 and WF2, each of the first, second, third, fourth, and fifth scan signals SS1_Ai, SS2_Bi, SS3_Bi-1, SS4_Ai, and SS5_Bi may be activated. During the first and second holding periods HF1 and HF2, the second, third, and fifth scan signals SS2_Bi, SS3_Bi-1, and SS5_Bi may be activated, and the first and fourth scan signals SS1_Ai and SS4_Ai may be deactivated. The light emission control signal EMi may be activated during the first and second writing periods WF1 and WF2 and during the first and second holding periods HF1 and HF2. In the second driving mode, the second, third, and fifth scan signals SS2_Bi, SS3_Bi-1, and SS5_Bi and the light emission control signal EMi may be output at the second scan frequency, and the first and fourth scan signals SS1_Ai and SS4_Ai may be output at the first scan frequency lower than the second scan frequency. In the second driving mode, a period of the second scan signal SS2_Bi may be smaller than a period of the fourth scan signal SS4_Ai.

Figure 7A:
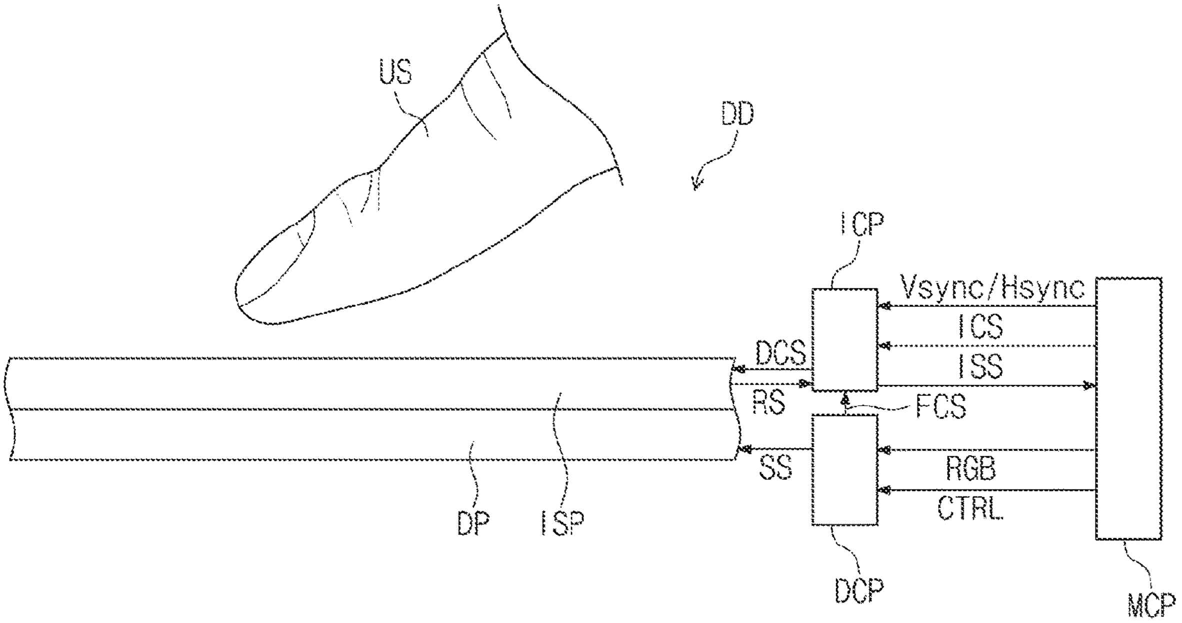
FIG. 7A is a block diagram of a display device according to an embodiment of the present disclosure.

FIG. 7A is a block diagram of the display device DD according to an embodiment of the present disclosure.

Referring to FIG. 7A, the display device DD may include the display panel DP, the input sensing layer ISP, a main driver MCP, the display driver DCP, and the sensing driver ICP.

The input sensing layer ISP may be disposed on the display panel DP and may sense an input applied thereto from outside of the display device DD. The input sensing layer ISP may sense the external input TC (refer to FIG. 1) generated by a body part of the user US.

The main driver MCP may control an overall operation of the display device DD. As an example, the main driver MCP may control an operation of the display driver DCP and the sensing driver ICP.

The display driver DCP may receive the image signals RGB and the control signal CTRL from the main driver MCP. The control signal CTRL may include various signals. As an example, the control signal CTRL may include a horizontal synchronization signal Hsync, a vertical synchronization signal Vsync, a main clock, and a data enable signal.

The display driver DCP may generate display signals SS that drive the display panel DP based on the image signals RGB and the control signal CTRL. As an example, the display signals SS may include the data signal and the scan signals.

The sensing driver ICP may control the input sensing layer ISP. The sensing driver ICP may receive a sensing control signal ICS, the vertical synchronization signal Vsync, and the horizontal synchronization signal Hsync from the main driver MCP. The sensing driver ICP may receive information about a driving frequency of the display panel DP from the display driver DCP.

The sensing control signal ICS may include a sensing clock signal and a signal including information on a relationship between a sensing frequency of the input sensing layer ISP and the driving frequency of the display panel DP.

As an example, the sensing driver ICP may generate the driving control signal DCS based on the sensing control signal ICS, the vertical synchronization signal Vsync, and the horizontal synchronization signal Hsync to drive the input sensing layer ISP. The sensing driver ICP may control an output of the driving control signal DCS based on information about the driving frequency of the display panel DP.

The sensing driver ICP may calculate the coordinate information of the external input TC (refer to FIG. 1) based on the sensing signals RS provided from the input sensing layer ISP, and may provide a coordinate signal ISS having the coordinate information to the main driver MCP. The main driver MCP may perform an operation corresponding to the external input TC generated by the user US based on the coordinate signal ISS. As an example, the main driver MCP may operate the display driver DCP based on the coordinate signal ISS such that a new image is displayed by the display panel DP.

Figure 7B:
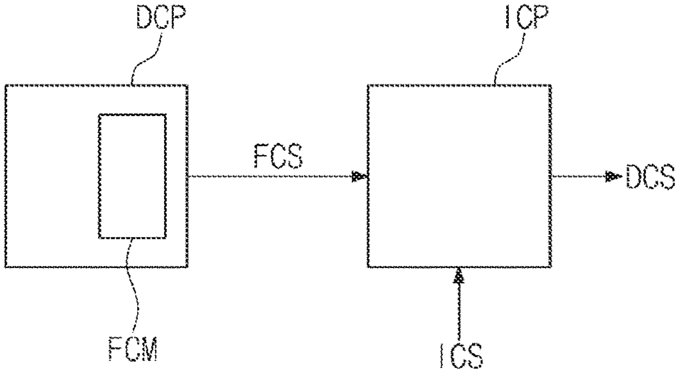
FIG. 7B is a block diagram showing a driving control signal generated by a sensing driver according to an embodiment of the present disclosure.

FIG. 7B is a block diagram showing the driving control signal DCS generated by the sensing driver ICP according to an embodiment of the present disclosure.

The sensing driver ICP may generate the driving control signal DCS based on a frequency control signal FCS applied thereto from the display driver DCP.

The display driver DCP may include a frequency control module FCM, which may also be referred to herein as a frequency controller. The frequency control module FCM may generate the frequency control signal FCS of the display panel. The frequency control module FCM may generate the frequency control signal FCS based on the image data signal DATA (refer to FIG. 6A) generated from the image signals RGB. As an example, the frequency control module FCM may compare the first frame PF1 (refer to FIG. 6C) with the second frame PF2 (refer to FIG. 6C), where the first and second frames PF1 and PF2 are two consecutive frames among the plurality of frames. In a case where the image is changed, e.g., when a video is played, the frequency control module FCM may generate a signal to control the driving frequency of the display panel to be at the high frequency of the first driving mode, and in a case where the image is not changed, e.g., when a still image is played, the frequency control module FCM may generate a signal to control the driving frequency of the display panel to be at the low frequency of the second driving mode.

The frequency control signal FCS may include information about the frequency of the vertical synchronization signal Vsync. The driving frequency of the display panel may be the same as the frequency of the vertical synchronization signal Vsync. Accordingly, the frequency control signal FCS may include information about the driving frequency of the display panel. As an example, the frequency control signal FCS may include information about the driving frequency of the display panel, which is changed to the high frequency and the low frequency.

Figure 8:
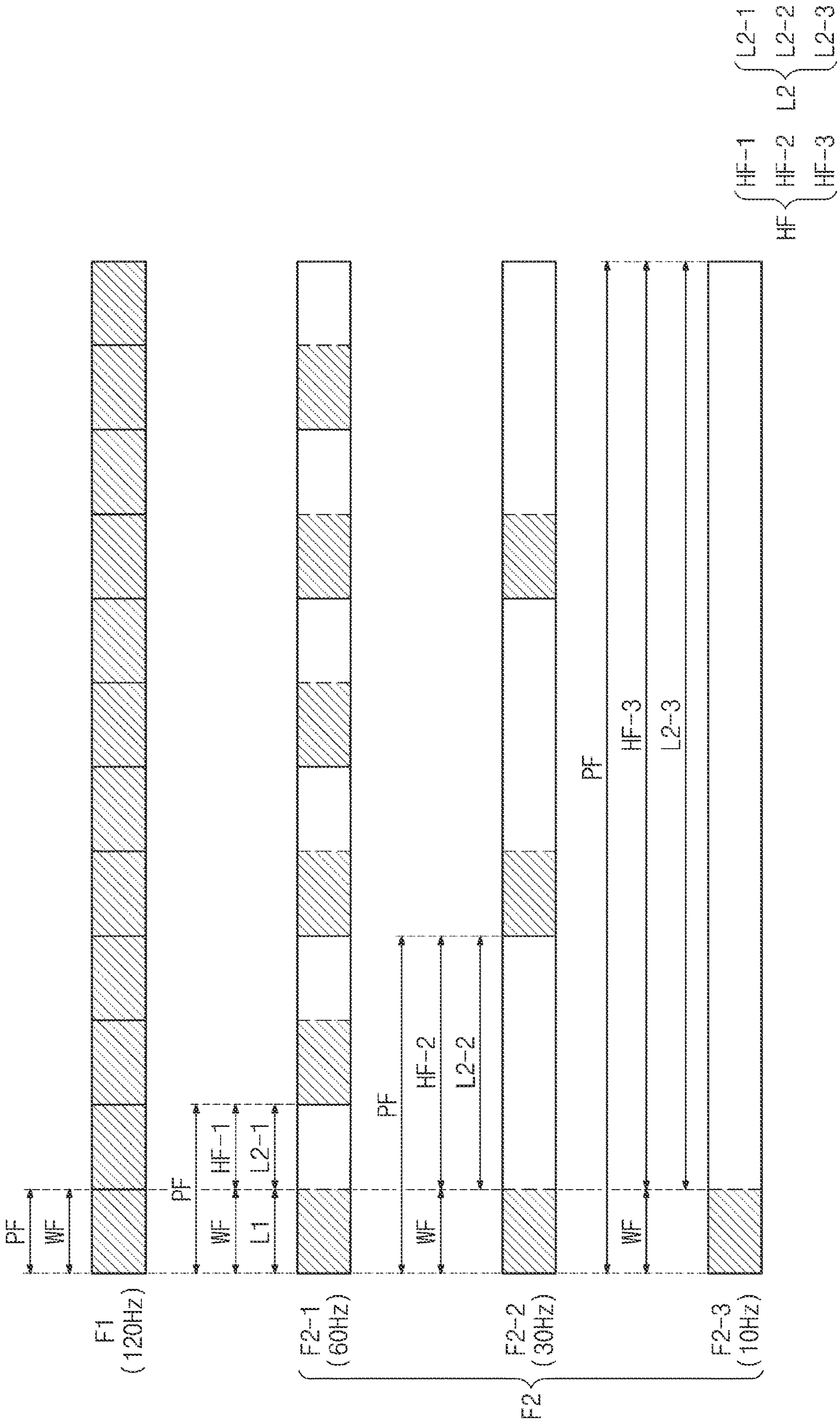
FIG. 8 is a view showing a variation of a driving frequency of a display panel according to an embodiment of the present disclosure.

The sensing driver ICP may receive the frequency control signal FCS from the display driver DCP and may receive the sensing control signal ICS from the main driver MCP (refer to FIG. 7A). The sensing driver ICP may determine an output of the driving control signal DCS based on the frequency control signal FCS and the sensing control signal ICS. The sensing driver ICP may determine the output of the driving control signal DCS based on the frequency control signal FCS after reflecting the change of the driving frequency of the display panel in the current frame. For example, the sensing driver ICP may determine whether to output the driving control signal DCS by reflecting the change in the driving frequency of the display panel. As an example, in a case where the driving frequency of the display panel corresponds to the low frequency smaller than about 120 Hz, the sensing driver ICP may control the driving control signal DCS to allow the driving control signal DCS to be output only in a period of each frame. This will be described in detail with reference to FIGS. 8 to 11. According to embodiments, the frequency control module FCM may output the frequency control signal FCS based on the image data signal DATA, and the data driver 200 may operate in the first driving mode or the second driving mode based on the frequency control signal FCS. FIG. 8 is a view showing a variation of the driving frequency of the display panel according to an embodiment of the present disclosure. FIG. 8 shows only some frames at each frequency.

In FIG. 8, the display panel DP (refer to FIG. 6A) may be driven at a first driving frequency F1 and a second driving frequency F2 (which includes a plurality of driving frequencies, as described below) by the display driver DCP (refer to FIG. 6A). The first and second driving frequencies F1 and F2 of the display panel DP may be changed in real time according to the image displayed on the display panel DP. The first driving frequency F1 may include the high frequency, and the second driving frequency F2 may include the low frequency. As an example, the first driving frequency F1 may be about 120 Hz, and the second driving frequency F2 may include frequencies smaller than about 120 Hz. In an embodiment, the second driving frequency F2 may be frequencies of about 60 Hz (F2-1), about 30 Hz (F2-2), and about 10 Hz (F2-3).

As an example, when video is displayed by the display panel DP, the display driver DCP may drive the display panel DP at the first driving frequency F1 during the first driving mode, and when a still image, e.g., a photograph, is displayed by the display panel DP, the display driver DCP may drive the display panel DP at the second driving frequency F2 in the second driving mode.

The display panel DP may display the image during the plural frames PR In an embodiment, when the display panel DP is driven at the first driving frequency F1 (hereinafter, referred to as the first driving mode), each of the frames PF may include a first period WF and does not include a second period HF. Alternatively, in an embodiment, when the display panel DP is driven at the second driving frequency F2 (hereinafter, referred to as the second driving mode), each of the frames PF may include the first period WF and the second period HF. The first period WF may correspond to a writing period, and the second period HF may correspond to a holding period. During the first period WF, the display driver DCP may generate the display driving signal to drive the display panel DP. In an embodiment, the display driver DCP may hold the display driving signal generated and does not generate a new display driving signal during the second period HF. In this case, the display driving signal may include at least one of the scan signals, the data signal, and the light emission driving signal.

As an example, in the first driving mode corresponding to the first driving frequency F1, the display driver DCP may generate the scan signal, the data signal, and the light emission driving signal during the first period WF. In an embodiment, in the second driving mode corresponding to the second driving frequency F2, the display driver DCP may generate the scan signal, the data signal, and the light emission driving signal during the first period WF, and the display driver DCP may generate only the light emission driving signal, and does not generate the scan signal and the data signal, and may hold the data signal, which is previously generated, during the second period HF. The display driver DCP may generate a scan signal, including a portion of a scan signal, during the second period HF.

According to an embodiment, the display driver DCP may drive the display panel DP at second driving frequencies F2 in the second driving mode. The second driving frequencies F2 may include a first frequency F2-1, a second frequency F2-2, and a third frequency F2-3. As an example, when the first driving frequency F1 is about 120 Hz, the first frequency F2-1 may be about 60 Hz, the second frequency F2-2 may be about 30 Hz, and the third frequency F2-3 may be about 10 Hz.

A length L1 of the first period WF of one frame PF at the first frequency F2-1, the second frequency F2-2, and the third frequency F2-3 may be the same as the length L1 of the first period WF of one frame PF at the first driving frequency F1.

The second periods HF-1, HF-2, and HF-3 respectively included in one frame PF at the first frequency F2-1, the second frequency F2-2, and the third frequency F2-3 may have different lengths. The length of the second periods HF-1, HF-2, and HF-3 may be inversely proportional to a magnitude of the frequency. For example, a length L2-2 of the second period HF-2 at the second frequency F2-2 may be greater than a length L2-1 of the second period HF-1 at the first frequency F2-1. A length L2-3 of the second period HF-3 at the third frequency F2-3 may be greater than the length L2-2 of the second period HF-2 at the second frequency F2-2.

The length of the first period WF and the second period HF in one frame PF may be the same as the length of the first period WF and the second period HF in the other frames PF in each of the first frequency F2-1, the second frequency F2-2, and the third frequency F2-3. The length L1 of the first period WF may be about equal to or smaller than the length L2 of the second period HF.

FIGS. 9A to 9D are views showing a variation in output of a driving control signal DCS of the sensing driver as a function of the driving frequency according to an embodiment of the present disclosure.

Figure 9A:
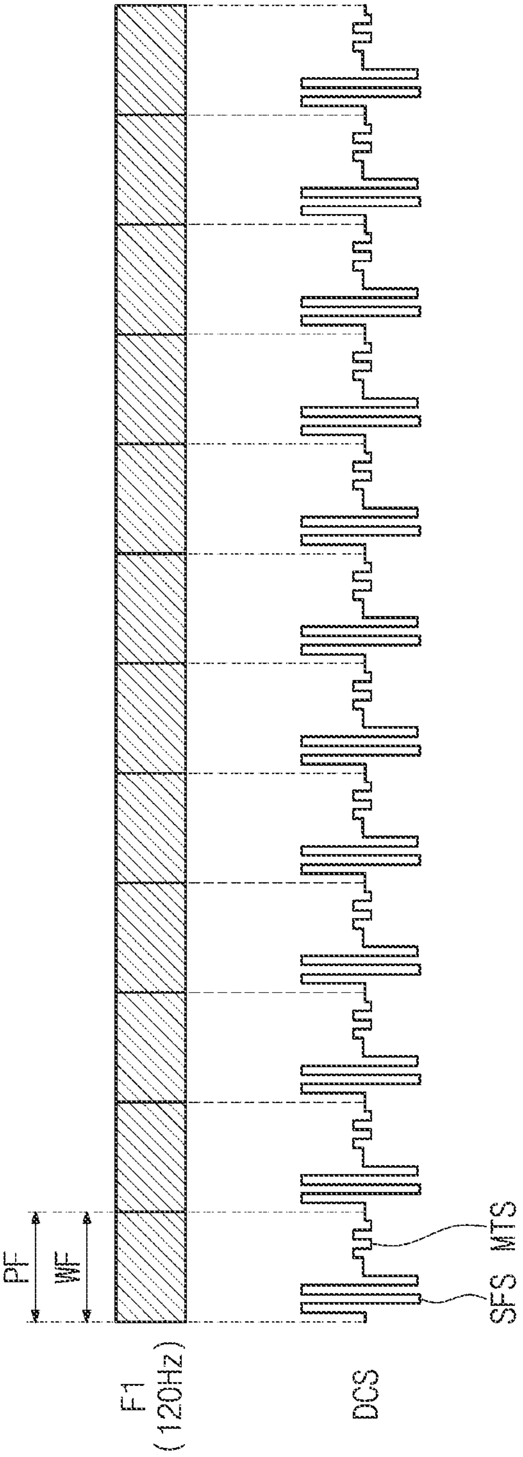
FIGS. 9A to 9D are views showing a variation in output of a driving control signal of a sensing driver as a function of a driving frequency according to an embodiment of the present disclosure.

FIG. 9A shows an output waveform of the driving control signal DCS of the sensing driver ICP (refer to FIG. 7A) at the first driving frequency F1. In the first driving mode in which the display driver DCP (refer to FIG. 7A) drives the display panel DP (refer to FIG. 7A) at the first driving frequency F1, the sensing driver ICP may output the driving control signal DCS in the first periods WF of each of the frames PR The driving control signal DCS may include a first driving signal MTS and a second driving signal SFS.

As described above, the first driving signal MTS may correspond to a signal that drives the input sensing layer ISP in the first method, and the second driving signal SFS may correspond to a signal that drives the input sensing layer ISP in the second method. In an embodiment, the first driving signal MTS and the second driving signal SFS may alternately appear in each of the frames PF. The order of the first driving signal MTS and the second driving signal SFS is not limited to that shown in figures. The driving control signal DCS may have a sensing frequency.

As shown in FIG. 9A, the sensing frequency of the driving control signal DCS may be the same as the first driving frequency F1. Each of the first driving frequency F1 and the sensing frequency may be about 120 Hz. According to an embodiment, the sensing frequency may be greater than the first driving frequency F1. For example, when the first driving frequency F1 is about 120 Hz, the sensing frequency may be about 240 Hz.

Figure 9B:
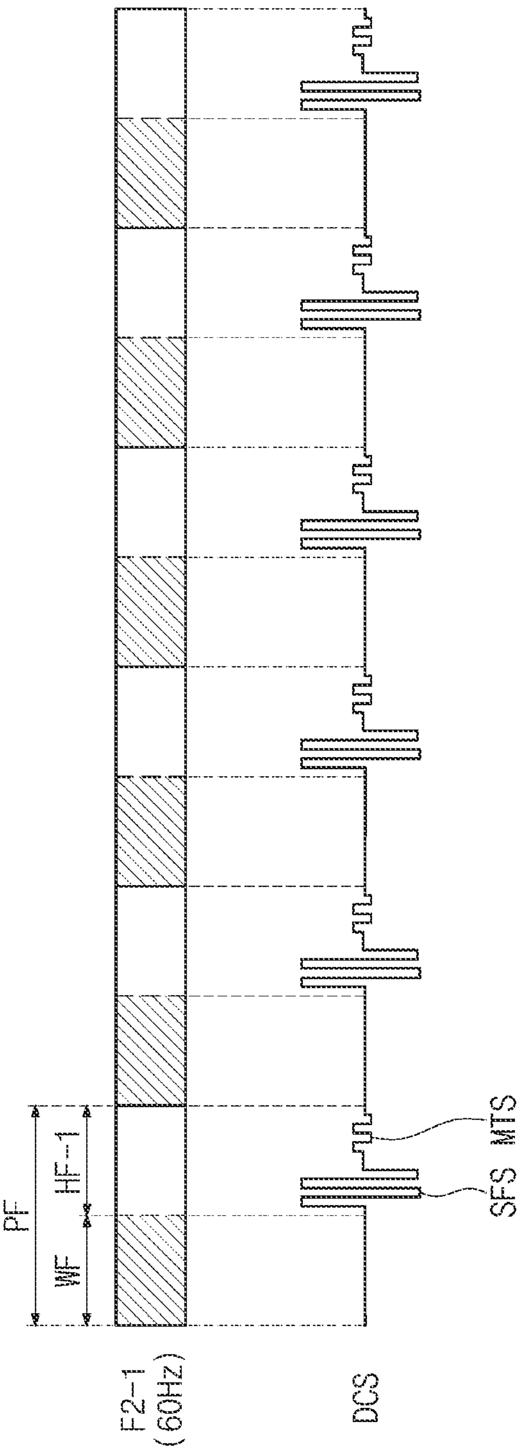
Figure 9C:
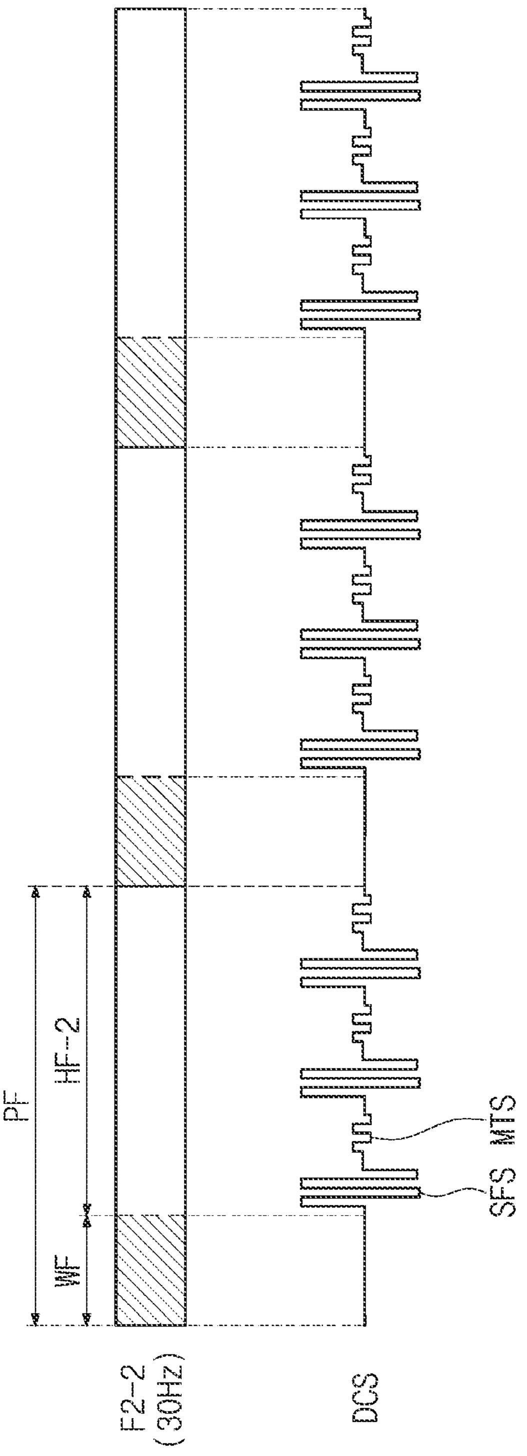
Figure 9D:
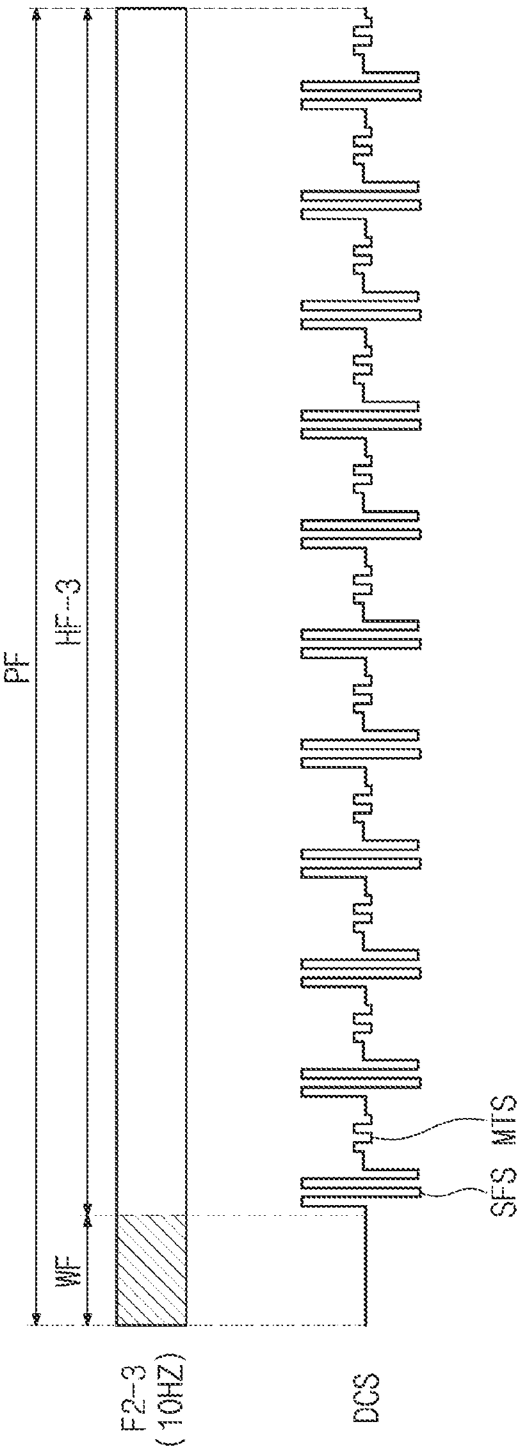

FIGS. 9B to 9D show the output waveforms of the driving control signals DCS of the sensing driver ICP at the second driving frequency F2. More particularly, FIG. 9B shows the driving control signal DCS at the first frequency F2-1, FIG. 9C shows the driving control signal DCS at the second frequency F2-2, and FIG. 9D shows the driving control signal DCS at the third frequency F2-3.

Referring to FIGS. 9B to 9D, the sensing driver ICP may drive the input sensing layer ISP only in some periods of each of the frames PF in the second driving mode in which the display driver DCP drives the display panel DP at the second driving frequency F2. For example, in the case where the display panel DP is driven at the second driving frequency F2, each of the frames PF may include periods in which the sensing driver ICP does not drive the input sensing layer ISP.

In an embodiment, since the sensing driver ICP does not drive the input sensing layer ISP in the first period WF in which the display driver DCP outputs the display driving signal to the display panel DP, and drives the input sensing layer ISP in the second period HF in which the display driver DCP does not output the display driving signal to the display panel DP, a noise, e.g., a touch to display noise (TDN), may be prevented from occurring between the display panel DP and the input sensing layer ISP. For example, the sensing driver ICP may generate the driving control signal DCS only in the second period HF.

FIG. 9B shows the output waveform of the driving control signal DCS of the sensing driver ICP at the first frequency F2-1. In the second driving mode, each of the frames PF may include the first period WF and the second period HF-1 following the first period WF. The first period WF and the second period HF-1 may have substantially the same length.

According to an embodiment, the sensing driver ICP may generate the driving control signal DCS only in the second period HF-1 and does not generate the driving control signal DCS in the first period WF. The sensing driver ICP may drive the input sensing layer ISP only in the second period HF-1 of each of the frames PF of the display panel DP.

In FIG. 9B, in the case where the display panel DP is driven at the low frequency, e.g., the first frequency F2-1 of about 60 Hz, the waveform of the driving control signal DCS that is coupled to the anode of the display panel DP and generates a noise appears only in the second period HF-1.

FIG. 9C shows the output waveform of the driving control signal DCS at the second frequency F2-2. In the second driving mode, each of the frames PF may include the first period WF and the second period HF-2 following the first period WF. The second period HF-2 may have a length greater than a length of the first period WF.

According to an embodiment, the sensing driver ICP may generate the driving control signal DCS only in the second period HF-2 and does not generate the driving control signal DCS in the first period WE For example, the sensing driver ICP may drive the input sensing layer ISP only in the second period HF-2 of each of the frames PF of the display panel DP.

In FIG. 9C, in the case where the display panel DP is driven at the low frequency, e.g., the second frequency F2-2 of about 30 Hz, the waveform of the driving control signal DCS that is coupled to the anode of the display panel DP and generates a noise appears only in the second period HF-2.

FIG. 9D shows the output waveform of the driving control signal DCS at the third frequency F2-3. In the second driving mode, each of the frames PF may include the first period WF and the second period HF-3 following the first period WF. The second period HF-3 may have a length greater than a length of the first period WF.

According to an embodiment, the sensing driver ICP may generate the driving control signal DCS only in the second period HF-3 and does not generate the driving control signal DCS in the first period WE For example, the sensing driver ICP may drive the input sensing layer ISP only in the second period HF-3 of each of the frames PF of the display panel DP.

In FIG. 9D, in the case where the display panel DP is driven at the low frequency, e.g., the third frequency F2-3 of about 10 Hz, the waveform of the driving control signal DCS that is coupled to the anode of the display panel DP and generates a noise continuously appears only in the second period HF-3.

In FIGS. 9B to 9D, the sensing driver ICP does not generate the driving control signal DCS in the first period WF of each of the frames PF. Accordingly, as the number of the first periods WF increases, the number of periods in which the input sensing layer ISP is not driven may increase. For example, when the number of the first periods WF increases, the number of times where the input sensing layer ISP senses the external input may decrease. The number of the first periods WF is the largest at the first frequency F2-1, and the number of the first periods WF at the second frequency F2-2 is greater than the number of the first periods WF at the third frequency F2-3 in the second driving frequency F2 with respect to the same time length. As the driving frequency of the display driver DCP in the second driving mode where the display driver DCP is driven at the second driving frequency F2 decreases, the number of sensing times of the input sensing layer ISP may increase. Therefore, in the second driving mode, the number of sensing times of the input sensing layer ISP is the largest at the third frequency F2-3 that is the smallest driving frequency, and the number of sensing times of the input sensing layer ISP is the smallest at the first frequency F2-1.

Figure 10A:
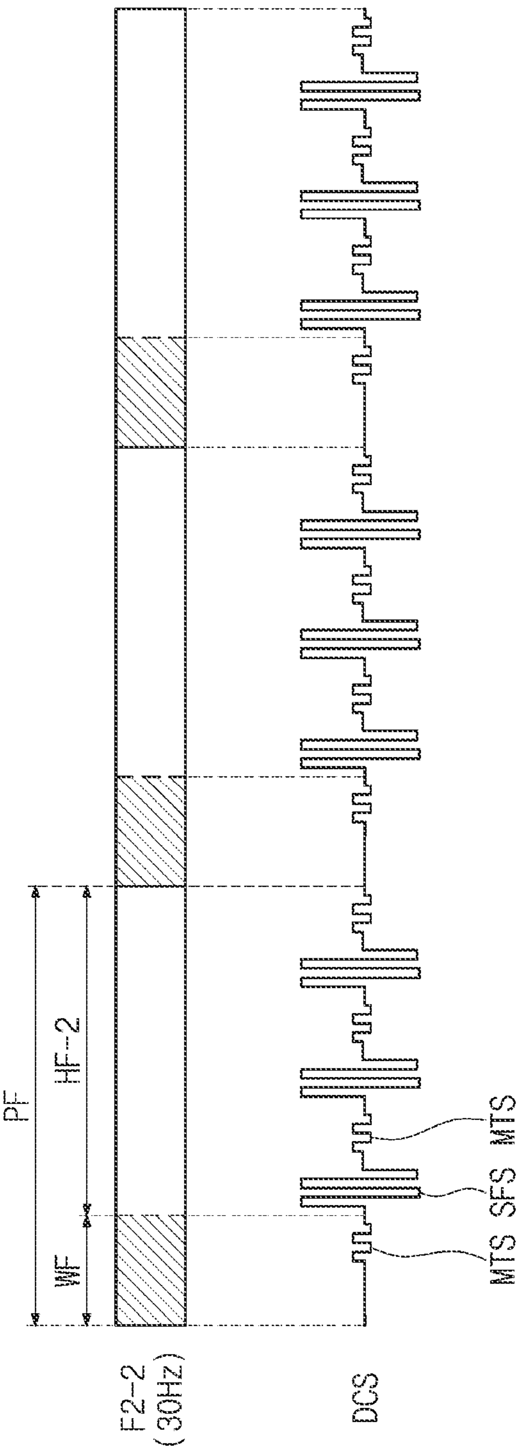
FIGS. 10A and 10B are views of a driving control signal of a sensing driver according to an embodiment of the present disclosure.
Figure 10B:
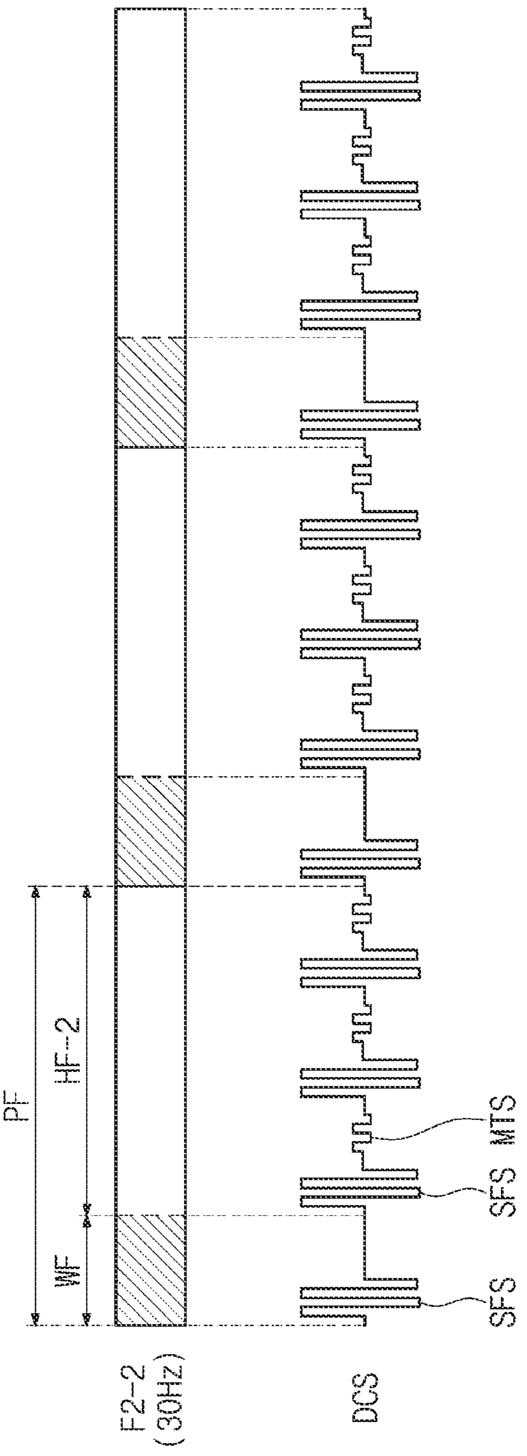

FIGS. 10A and 10B are views of the driving control signal DCS of the sensing driver according to an embodiment of the present disclosure. FIGS. 10A and 10B show the second frequency F2-2 of the second driving frequency F2 as a representative example. However, embodiments as illustrated in FIGS. 10A and 10B may be applied to other low frequencies including the first frequency F2-1 and the third frequency F2-3, which are smaller than about 120 Hz.

FIG. 10A shows the driving control signal DCS generated by the sensing driver ICP in a case where only the second driving signal SFS among the first driving signal MTS and the second driving signal SFS of the input sensing layer ISP is coupled to the display panel DP and generates the noise.

When the display panel DP is driven at the second frequency F2-2 as shown in FIG. 10A, the sensing driver ICP may generate the second driving signal SFS only in the second period HF-2. The sensing driver ICP may generate the first driving signal MTS in the first period WF and the second period HF-2. For example, according to embodiments, the sensing driver ICP does not generate the second driving signal SFS that is coupled to the display panel DP, and generates the noise in the first period WF in which the display panel DP generates the display driving signal, and may generate the second driving signal SFS only in the second period HF-2 in which the display panel DP does not generate the display driving signal and holds the generated display driving signal. The first driving signal MTS that is not coupled to the display panel DP and does not generate the noise may be generated in both the first period WF and the second period HF-2.

FIG. 10B shows the driving control signal DCS generated by the sensing driver ICP in a case where the first driving signal MTS among the first driving signal MTS and the second driving signal SFS of the input sensing layer ISP is coupled to the display panel DP and generates the noise.

When the display panel DP is driven at the second frequency F2-2 as shown in FIG. 10B, the sensing driver ICP may generate the first driving signal MTS only in the second period HF-2. The sensing driver ICP may generate the second driving signal SFS in the first period WF and the second period HF-2. For example, in an embodiment, the sensing driver ICP does not generate the first driving signal MTS that is coupled to the display panel DP, and generates the noise in the first period WF in which the display panel DP generates the display driving signal, and may generate the first driving signal MTS only in the second period HF-2 in which the display panel DP does not generate the display driving signal, and holds the generated display driving signal. The second driving signal SFS that is not coupled to the display panel DP and does not generate the noise may be generated in both the first period WF and the second period HF-2.

Figure 11:
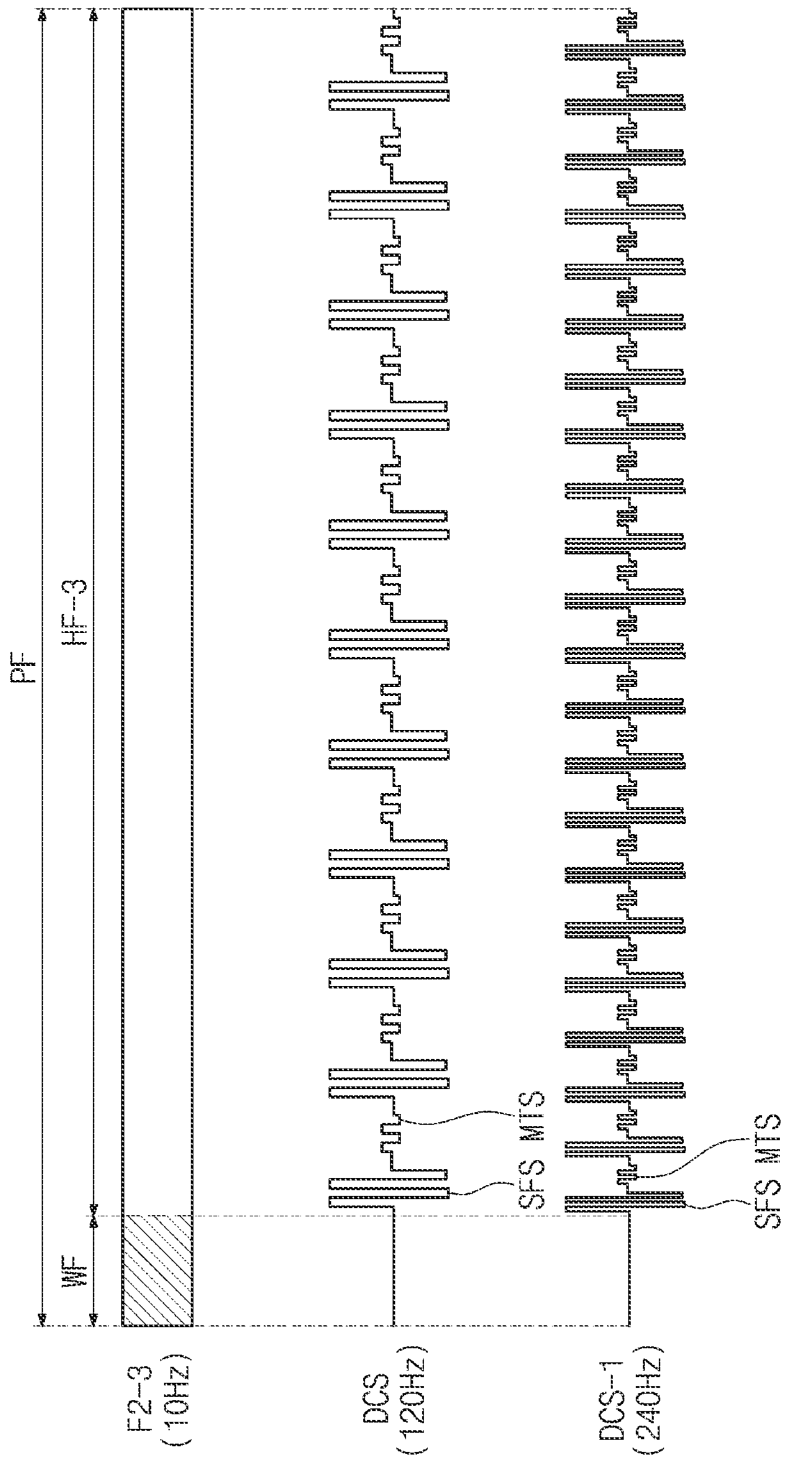
FIG. 11 is a view of a driving control signal of a sensing driver according to an embodiment of the present disclosure.

FIG. 11 is a view of a driving control signal DCS and DCS-1 of a sensing driver according to an embodiment of the present disclosure. FIG. 11 shows a case in which the display panel DP is driven at the third frequency F2-3 of the second driving frequency F2. However, embodiments of the present disclosure are not limited thereto.

In FIG. 11, the sensing frequency of the driving control signal DCS or DCS-1 of the sensing driver ICP may be about 120 Hz or about 240 Hz. For example, when the driving frequency of the display driver DCP is the first driving frequency F1, the first driving frequency F1 may be about 120 Hz. When the display driver DCP drives the display panel DP at the second driving frequency F2, the second driving frequency F2 may be the low frequency smaller than the first driving frequency F1. For example, the second driving frequency F2 may be within a range from about 90 Hz to about 10 Hz. In this case, the sensing frequency of the driving control signal DCS or DCS-1 of the sensing driver ICP may be about 120 Hz, which is the same as the first driving frequency F1, or about 240 Hz, which is higher than the first driving frequency F1.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A display device, comprising:

a display panel that displays an image;

an input sensing layer disposed on the display panel, wherein the input sensing layer senses an input applied thereto from outside of the display device;

a display driver that receives an image signal and drives the display panel at a first driving frequency or a second driving frequency lower than the first driving frequency; and a sensing driver that drives the input sensing layer, wherein the display panel displays the image in a plurality of frames, and each frame comprises a first period when the display panel is driven at the first driving frequency, and each frame comprises the first period and a second period when the display panel is driven at a second frequency, wherein the sensing driver drives the input sensing layer by generating a first driving signal and a second driving signal in the first period of each of the frames when the display panel is driven at the first driving frequency, and drives the input sensing layer by generating the first driving signal and the second driving signal only in the second period except for the first period of each of the frames when the display panel is driven at the second driving frequency.

2. The display device of claim 1, wherein each of the frames comprises only the first period when the display panel is driven at the first driving frequency, wherein the display driver outputs a display driving signal to the display panel in the first period, and the outputted display driving signal is held in the second period.

3. The display device of claim 1, wherein a length of the first period when the display panel is driven at the first driving frequency is about equal to a length of the first period when the display panel is driven at the second driving frequency in each of the frames.

4. The display device of claim 3, wherein a length of the second period is about equal to or greater than the length of the first period in each of the frames when the display panel is driven at the first driving frequency.

5. The display device of claim 3, wherein the second driving frequency comprises a first frequency and a second frequency different from the first frequency, the length of the first period when the display panel is driven at the first frequency of the second driving frequency is about equal to the length of the first period when the display panel is driven at the second frequency of the second driving frequency in each of the frames, and a length of the second period when the display panel is driven at the first frequency of the second driving frequency is different from a length of the second period when the display panel is driven at the second frequency of the second driving frequency in each of the frames.

6. The display device of claim 1, wherein the display driver comprises:

a scan driver that outputs a scan signal to the display panel;

a data driver that outputs a data signal to the display panel in a first driving mode in which the display panel is driven at the first driving frequency and in a second driving mode in which the display panel is driven at the second driving frequency; and a driving controller that receives the image signal and an external control signal and generates a scan control signal, a data control signal, and image data based on the image signal and the external control signal, wherein the driving controller drives the display panel at the first driving frequency and the second driving frequency based on the image data.

7. The display device of claim 6, wherein the driving controller comprises a frequency controller that outputs a frequency control signal based on the image data, and the data driver operates in the first driving mode or the second driving mode based on the frequency control signal.

8. The display device of claim 7, wherein the frequency controller compares a first frame with a second frame, which are consecutive frames among the frames, controls the data driver to operate in the first driving mode when the image is changed, and controls the data driver to operate in the second driving mode when the image is not changed.

9. The display device of claim 1, wherein the sensing driver generates a driving control signal that drives the input sensing layer, and the driving control signal comprises the first driving signal that drives the input sensing layer using a first capacitance detection method and the second driving signal that drives the input sensing layer using a second capacitance detection method different from the first capacitance detection method.

10. The display device of claim 9, wherein the sensing driver alternately outputs the first driving signal and the second driving signal in each of the frames while driving the input sensing layer.

11. The display device of claim 9, wherein the sensing driver outputs the driving control signal at a sensing frequency, and the sensing frequency is about equal to or greater than the first driving frequency.

12. A display device, comprising:

a display panel that displays an image in a plurality of frames, wherein each frame comprises a first period when the display panel is driven at a first driving frequency, and each frame comprises the first period and a second period following the first period when the display panel is driven at a second frequency;

an input sensing layer disposed on the display panel, wherein the input sensing layer senses an input applied thereto from outside of the display device;

a display driver that receives an image signal, drives the display panel at the first driving frequency in a first driving mode, and drives the display panel at the second driving frequency lower than the first driving frequency in a second driving mode; and a sensing driver that outputs a first driving signal and a second driving signal, which are alternately applied to the input sensing layer in each of the frames, wherein each of the frames comprises the first period in the first driving mode, and each of the frames comprises the first period and the second period in the second driving mode, wherein the sensing driver generates the first driving signal and the second driving signal in the first period of each of the frames in the first driving mode, and the sensing driver generates only one of the first driving signal and the second driving signal in the first period of each of the frames and generates the first driving signal and the second driving signal in the second period of each of the frames in the second driving mode.

13. The display device of claim 12, wherein the display driver outputs a display driving signal that drives the display panel in the first period, and holds the outputted display driving signal in the second period.

14. The display device of claim 12, wherein the display driver determines the first driving mode as a driving mode of the display panel when a first image signal and a second image signal respectively corresponding to a first frame and a second frame following the first frame among the frames are different from each other, and determines the second driving mode as the driving mode of the display panel when the first image signal and the second image signal are the same as each other.

15. The display device of claim 12, wherein a length of the first period of each of the frames in the first driving mode is about equal to a length of the first period of each of the frames in the second driving mode.

16. The display device of claim 15, wherein the second period corresponds to a remaining period except the first period in each of the frames, and a length of the second period is inversely proportional to a magnitude of the second driving frequency.

17. The display device of claim 12, wherein the display driver comprises:

a scan driver that outputs a scan signal to the display panel; and a data driver that outputs a data signal to the display panel.

18. The display device of claim 12, wherein the sensing driver drives the input sensing layer at a sensing frequency, and the sensing frequency is about equal to or greater than the first driving frequency.

19. The display device of claim 12, wherein the input sensing layer is disposed directly on the display panel.

* * * * *